US012683422B2

(12) United States Patent
Choi et al.

(10) Patent No.: US 12,683,422 B2
(45) Date of Patent: Jul. 14, 2026

(54) ELECTRONIC DEVICE HAVING CHARGING CIRCUIT

(71) Applicant: Samsung Electronics Co., Ltd., Suwon-si (KR)

(72) Inventors: Hangseok Choi, Suwon-si (KR); Sangwoo Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 769 days.

(21) Appl. No.: 18/172,809

(22) Filed: Feb. 22, 2023

(65) Prior Publication Data

US 2023/0318344 A1 Oct. 5, 2023

Related U.S. Application Data

(63) Continuation of application No. PCT/KR2022/021585, filed on Dec. 29, 2022.

(30) Foreign Application Priority Data

| | | |
|---|---|---|
| Apr. 4, 2022 | (KR) | 10-2022-0041831 |
| Jul. 5, 2022 | (KR) | 10-2022-0082389 |

(51) Int. Cl.
| | |
|---|---|
| *H02J 7/00* | (2026.01) |
| *H02J 7/70* | (2026.01) |
| *H02J 7/96* | (2026.01) |
| *H02J 7/64* | (2026.01) |
| *H02J 7/80* | (2026.01) |

(52) U.S. Cl.
CPC ............... *H02J 7/96* (2026.01); *H02J 7/751* (2026.01); *H02J 7/64* (2026.01); *H02J 7/80* (2026.01); *H02J 2207/20* (2020.01)

(58) Field of Classification Search
USPC .......................................................... 320/137
See application file for complete search history.

(56) References Cited

U.S. PATENT DOCUMENTS

| | | | |
|---|---|---|---|
| 10,985,654 B2 | 4/2021 | Nomiyama et al. | |
| 11,171,501 B2 | 11/2021 | Fan et al. | |
| (Continued) | | | |

FOREIGN PATENT DOCUMENTS

| | | |
|---|---|---|
| JP | 2021-112095 A | 8/2021 |
| KR | 10-2016-0055509 A | 5/2016 |
| (Continued) | | |

OTHER PUBLICATIONS

Extended European Search Report dated Feb. 7, 2025, issued in a European Application No. 22936654.7.

(Continued)

*Primary Examiner* — Samuel Berhanu
(74) *Attorney, Agent, or Firm* — Jefferson IP Law, LLP

(57) ABSTRACT

An electronic device configured to minimize heating and quickly charge a battery is provided. The electronic device includes a simple circuit configuration for charging a battery in consideration of compatibility can be provided. When an electronic device has relatively much power consumption of a load circuit of the electronic device while an adaptor is connected to the electronic device, the electronic device may temporarily stop power supply to the battery and thus suppress an increase in internal temperature of the battery.

20 Claims, 19 Drawing Sheets

(56)     References Cited

U.S. PATENT DOCUMENTS

| 11,258,359 | B2 | 2/2022 | Baek et al. | |
| 2009/0033293 | A1* | 2/2009 | Xing | H02J 7/00712 |
| | | | | 323/284 |
| 2018/0115157 | A1 | 4/2018 | Chan et al. | |
| 2018/0129234 | A1 | 5/2018 | Melgar et al. | |
| 2019/0115765 | A1 | 4/2019 | Lai et al. | |
| 2019/0393702 | A1 | 12/2019 | Su et al. | |
| 2020/0161976 | A1* | 5/2020 | Song | H02M 3/158 |
| 2020/0203964 | A1 | 6/2020 | Chen et al. | |
| 2020/0244161 | A1 | 7/2020 | Hou et al. | |
| 2020/0251913 | A1 | 8/2020 | Zhou et al. | |
| 2021/0119465 | A1 | 4/2021 | Choi et al. | |
| 2021/0119487 | A1 | 4/2021 | Choi et al. | |
| 2021/0218332 | A1 | 7/2021 | Sakamoto | |
| 2022/0149644 | A1* | 5/2022 | Liu | H02J 7/0068 |

FOREIGN PATENT DOCUMENTS

| KR | 10-2019-0017300 | A | 2/2019 |
| KR | 10-2020-0075849 | A | 6/2020 |
| KR | 10-2020-0079232 | A | 7/2020 |
| KR | 10-2021-0045911 | A | 4/2021 |
| KR | 10-2021-0045912 | A | 4/2021 |
| KR | 10-2021-0129894 | A | 10/2021 |
| KR | 10-2623007 | B1 | 1/2024 |
| WO | 2021/075916 | A1 | 4/2021 |

OTHER PUBLICATIONS

International Search Report dated Apr. 7, 2023, issued in International Application No. PCT /KR2022/021585.

* cited by examiner

FIG. 3

<FIRST SWITCHING STATE>

<SECOND SWITCHING STATE>

<THIRD SWITCHING STATE>

<FOURTH SWITCHING STATE>

350

351    QB1

501    350b

352    QB2

355

353    QB3

354    QB4

<FIFTH SWITCHING STATE>

<SIXTH SWITCHING STATE>

IQA 1

720

8
7
6
5
4
3
2
1
0
-1

CURRENT (A)

TIME

ELECTRONIC DEVICE HAVING CHARGING CIRCUIT

CROSS-REFERENCE TO RELATED APPLICATION(S)

This application is a continuation application, claiming priority under § 365(c), of an International application No. PCT/KR2022/021585, filed on Dec. 29, 2022, which is based on and claims the benefit of a Korean patent application number 10-2022-0041831, filed on Apr. 4, 2022, in the Korean Intellectual Property Office, and of a Korean patent application number 10-2022-0082389, filed on Jul. 5, 2022, in the Korean Intellectual Property Office, the disclosure of each of which is incorporated by reference herein in its entirety.

TECHNICAL FIELD

The disclosure relates to an electronic device having a charging circuit. More particularly, the disclosure relates to an electronic device having a simple circuit configuration for charging a battery in consideration of compatibility.

BACKGROUND ART

An adaptor (for example, a travel adaptor or a wall adaptor) may be connected to a power reception device through a cable and configured to supply power to the power reception device. The power reception device (for example, a smartphone) may charge a battery with power supplied from the adaptor and supply power to a load circuit (for example, a processor, a display, or a camera). For example, the power supplied from the adaptor to the power reception device may be distributed to the battery and/or the load circuit through a charging circuit.

In a direct charging technology, the voltage and current control are handled by an adaptor supporting a programmable power supply (PPS) function rather than by the power reception device including the battery, and thus heating in the power reception device can be minimized and the battery can be quickly charged.

When a direct charging circuit in the power reception device is used to charge the battery, low heating and high charging efficiency are provided, but a ratio of the output voltage to the input voltage (hereinafter, referred to as a voltage conversion ratio) is fixed to, for example, 2:1. When an adaptor which does not support the PPS function is connected to the electronic device, the direct charging circuit have difficulty in charging the battery. Accordingly, a switching charging circuit capable of adjusting the voltage conversion ratio may be included in the power reception device in case the adaptor connected to the power reception device does not support the PPS function.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

When a voltage and/or current value of a power signal received from an adaptor is converted, a switching charging circuit has relatively low efficiency and thus may have serious heating when being applied to quick charging. Further, in consideration of compatibility, not only a direct charging circuit but also the switching charging circuit should be included in the electronic device. In this case, a mounting space may be lack or costs of the electronic device may increase. When the battery is charged, internal temperature of the battery may increase. When a load circuit has relatively much power consumption due to execution of an application (for example, game) requiring high-specification performance, internal temperature of the battery which is being charged may be aggravated by heat generated in the load circuit due to power consumption.

Aspects of the disclosure are to address at least the above-mentioned problems and/or disadvantages and to provide at least the advantages described below. Accordingly, an aspect of the disclosure is to provide an electronic device configured to minimize heating and quickly charge a battery.

Another aspect of the disclosure is to provide an electronic device having a simple circuit configuration for charging the battery in consideration of compatibility.

According to an embodiment of the disclosure, when the load circuit has relatively much power consumption while an adaptor is connected to the electronic device, the electronic device may temporarily stop power supply to the battery and thus suppress an increase in internal temperature of the battery.

Additional aspects will be set forth in part in the description which follows and, in part, will be apparent from the description, or may be learned by practice of the presented embodiments.

Solution to Problem

In accordance with an aspect of the disclosure, a portable electronic device is provided. The portable electronic device includes a connector including a power terminal and a data terminal, a first power conversion circuit, a second power conversion circuit, and a control circuit electrically connected to the data terminal, the first power conversion circuit, and the second power conversion circuit. The first power conversion circuit includes a first input terminal connected to the power terminal, a first output terminal connected to a load circuit and a battery of the portable electronic device, a switch 1-1, a switch 1-2, a switch 1-3, and a switch 1-4 connected in series from the first input terminal to a ground of the portable electronic device, an inductor having one end connected to a point between the switch 1-2 and the switch 1-3 and the other end connected to the first output terminal, and a first capacitor having one end connected to a point between the switch 1-1 and the switch 1-2 and the other end connected to a point between the switch 1-3 and the switch 1-4. The second power conversion circuit includes a second input terminal connected to the power terminal, a second output terminal connected to the load circuit and the battery, a switch 2-1 and a switch 2-2 connected in series from the second input terminal to the second output terminal, a switch 2-3 and a switch 2-4 connected in series from the second output terminal to the ground, and a second capacitor having one end connected to a point between the switch 2-1 and the switch 2-2 and the other end connected to a point between the switch 2-3 and the switch 2-4. The control circuit is configured to identify whether a power supply device connected to the connector supports a programmable power supply (PPS) function through the data terminal. The control circuit is configured to, in case that it is identified that the power supply device supports the PPS function, output a first switching control signal having a switching frequency equal to a resonant frequency of the first capacitor and the inductor and a duty cycle of 50% and alternating a first switching state in which the switch 1-1 and the switch 1-3 are closed and the switch 1-2 and the switch 1-4 are open and a second switching state in which the switch 1-1 and the switch 1-3 are open and the switch 1-2 and the switch 1-4 are closed to the first power conversion circuit and output a second switching control signal having a switching frequency and a duty cycle, which are identical to the switching frequency and the duty cycle of the first switching control signal but a phase difference of 180 degrees from the first switching control signal to the second power conversion circuit. The control circuit is configured to, in case that it is identified that the power supply device does not support the PPS function, deactivate the second power conversion circuit and output a third switching control signal having a switching frequency equal to or higher than the resonant frequency of the first capacitor and the inductor, making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit. The control circuit is configured to make the third switching control signal have a third switching state in which both the switch 1-1 and the switch 1-2 are closed or a fourth switching state in which both the switch 1-1 and the switch 1-2 are open according to the charging state of the battery.

In accordance with another aspect of the disclosure, a portable electronic device is provided. The portable electronic device includes a connector comprising a power terminal and a data terminal, a first power conversion circuit, a second power conversion circuit, a battery switch, and a control circuit electrically connected to the data terminal, the first power conversion circuit, the second power conversion circuit, and the battery switch. The first power conversion circuit includes a first input terminal connected to the power terminal, a first output terminal connected to a load circuit of the portable electronic device, a switch 1-1, a switch 1-2, a switch 1-3, and a switch 1-4 connected in series from the first input terminal to a ground of the portable electronic device, an inductor having one end connected to a point between the switch 1-2 and the switch 1-3 and the other end connected to the first output terminal, and a first capacitor having one end connected to a point between the switch 1-1 and the switch 1-2 and the other end connected to a point between the switch 1-3 and the switch 1-4. The second power conversion circuit includes a second input terminal connected to the power terminal, a second output terminal connected to a battery of the portable electronic device, a switch 2-1 and a switch 2-2 connected in series from the second input terminal to the second output terminal, a switch 2-3 and a switch 2-4 connected in series from the second output terminal to the ground, and a second capacitor having one end connected to a point between the switch 2-1 and the switch 2-2 and the other end connected to a point between the switch 2-3 and the switch 2-4. One end of the battery switch is connected to a point between the first output terminal and the load circuit and the other end of the battery switch is connected to a point between the second output terminal and the battery. The control circuit is configured to, in case that it is identified that the power supply device supports or does not support a PPS function, a voltage value which can be supplied is a predetermined value, and a predetermined first event is generated by the electronic device, open the battery switch, deactivate the second power conversion circuit, and output a first switching control signal having a switching frequency equal to a resonant frequency of the first capacitor and the inductor and a duty cycle of 50% and alternating a first switching state in which the switch 1-1 and the switch 1-3 are closed and the switch 1-2 and switch 1-4 are open and a second switching state in which the switch 1-1 and the switch 1-3 are open and the switch 1-2 and the switch 1-4 are closed to the first power conversion circuit.

In accordance with another aspect of the disclosure, a method of operating a portable electronic device is provided. The portable electronic device includes a connector including a power terminal and a data terminal, a first power conversion circuit, and a second power conversion circuit. The first power conversion circuit includes a first input terminal connected to the power terminal, a first output terminal connected to a load circuit and a battery of the portable electronic device, a switch 1-1, a switch 1-2, a switch 1-3, and a switch 1-4 connected in series from the first input terminal to a ground of the portable electronic device, an inductor having one end connected to a point between the switch 1-2 and the switch 1-3 and the other end connected to the first output terminal, and a first capacitor having one end connected to a point between the switch 1-1 and the switch 1-2 and the other end connected to a point between the switch 1-3 and the switch 1-4. The second power conversion circuit includes a second input terminal connected to the power terminal, a second output terminal connected to the load circuit and the battery, a switch 2-1 and a switch 2-2 connected in series from the second input terminal to the second output terminal, a switch 2-3 and a switch 2-4 connected in series from the second output terminal to the ground, and a second capacitor having one end connected to a point between the switch 2-1 and the switch 2-2 and the other end connected to a point between the switch 2-3 and the switch 2-4. The method includes identifying whether a power supply device connected to the connector supports a programmable power supply (PPS) function through the data terminal, in case that it is identified that the power supply device supports the PPS function, outputting a first switching control signal having a switching frequency equal to a resonant frequency of the first capacitor and the inductor and a duty cycle of 50% and alternating a first switching state in which the switch 1-1 and the switch 1-3 are closed and the switch 1-2 and the switch 1-4 are open and a second switching state in which the switch 1-1 and the switch 1-3 are open and the switch 1-2 and the switch 1-4 are closed to the first power conversion circuit and output a second switching control signal having a switching frequency and a duty cycle, which are identical to the switching frequency and the duty cycle of the first switching control signal but a phase difference of 180 degrees from the first switching control signal to the second power conversion circuit, in case that it is identified that the power supply device does not support the PPS function, deactivating the second power conversion circuit and outputting a third switching control signal having a switching frequency equal to or higher than the resonant frequency of the first capacitor and the inductor, making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit, and making the third switching control signal have a third switching state in which both the switch 1-1 and the switch 1-2 are closed or a fourth switching state in which both the switch 1-1 and the switch 1-2 are open according to the charging state of the battery.

Advantageous Effects of Invention

According to various embodiments of the disclosure, an electronic device can have a simple circuit configuration for charging a battery and minimize heating. According to various embodiments of the disclosure, an electronic device can quickly charge a battery and suppress an increase in internal temperature of the battery.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a block diagram illustrating an electronic device configured to supply power to a load circuit and charge a battery by using power received from a power supply device according to an embodiment of the disclosure;

FIG. 7 illustrates waveforms of a current in a first power conversion circuit while an electronic device operates in a pass through mode according to an embodiment of the disclosure;

Throughout the drawings, it should be noted that like reference numbers are used to depict the same or similar elements, features, and structures.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
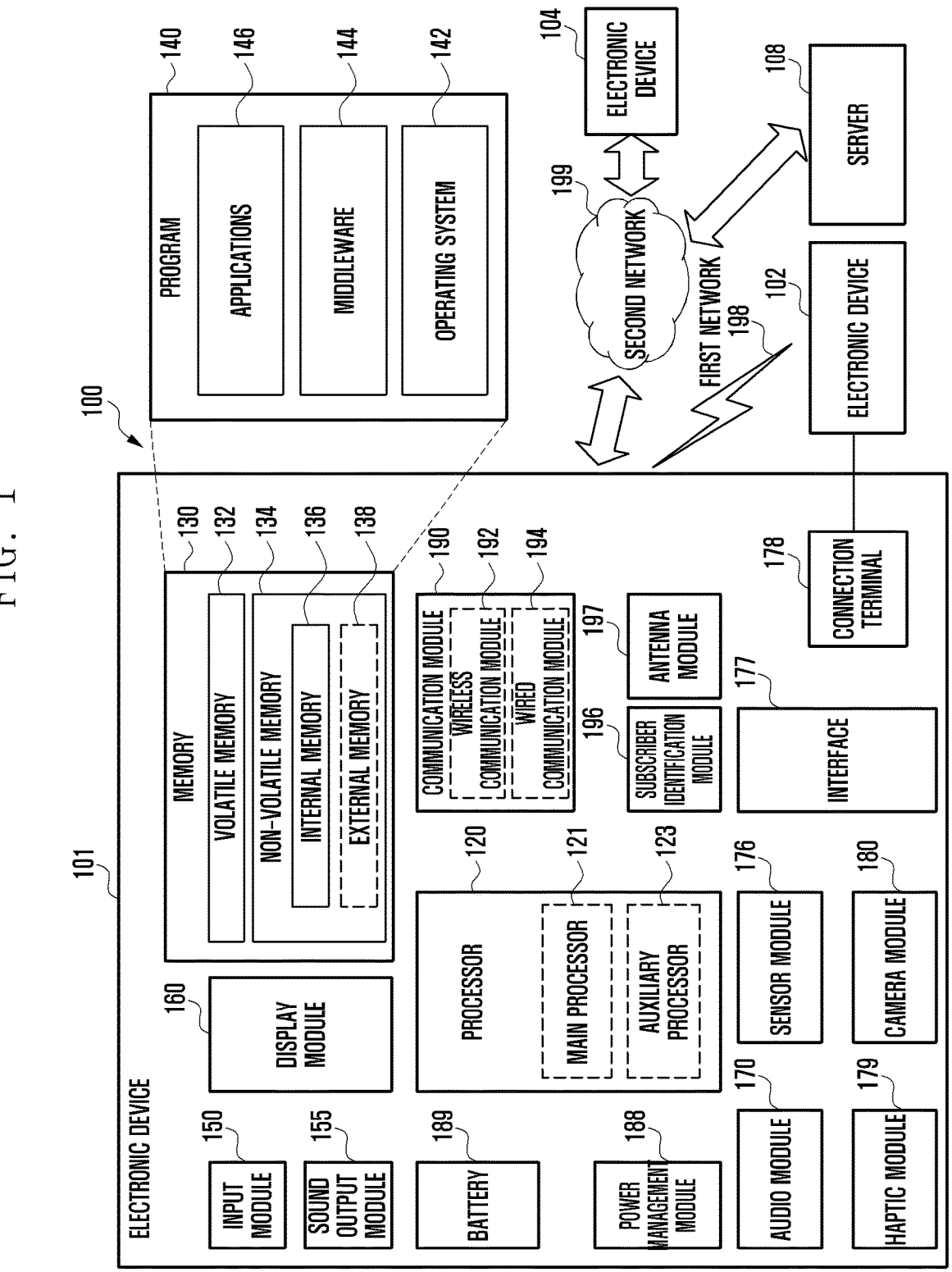
FIG. 1 is a block diagram illustrating an electronic device within a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element composed of a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
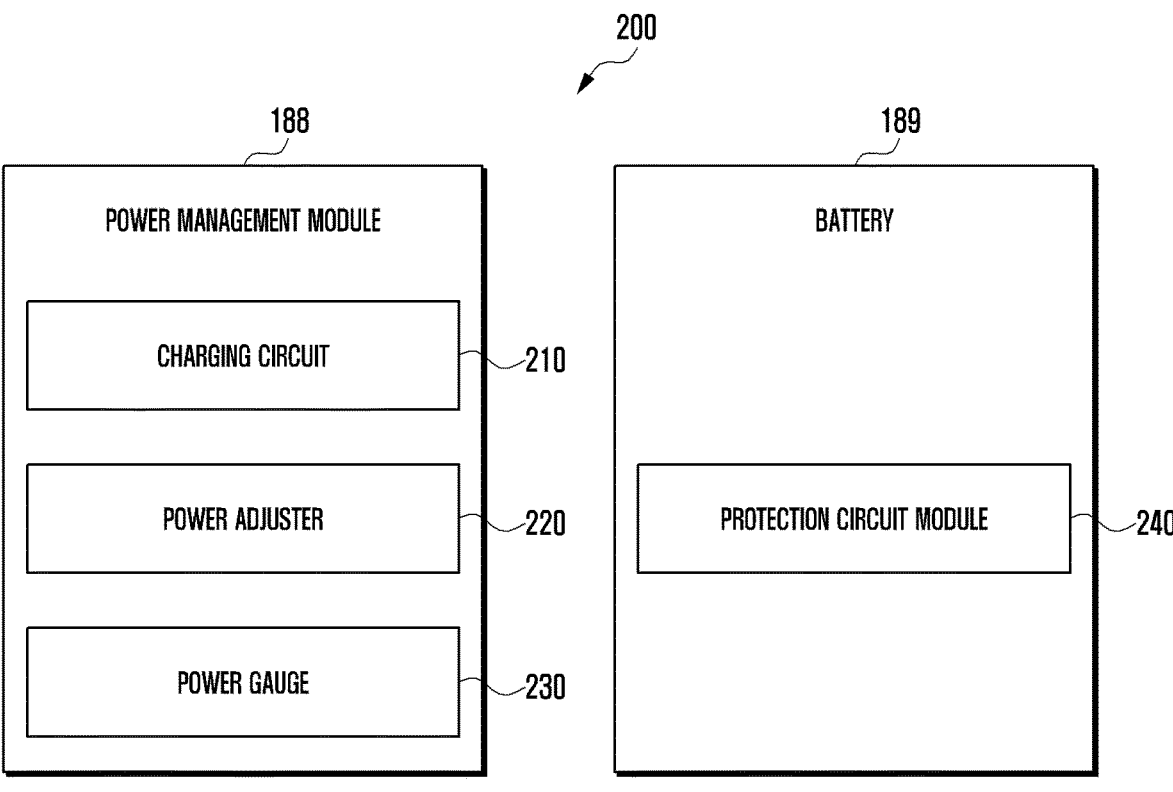
FIG. 2 is a block diagram illustrating a power management module and a battery according to an embodiment of the disclosure.

FIG. 2 is a block diagram 200 illustrating the power management module 188 and the battery 189 according to an embodiment of the disclosure.

Referring to FIG. 2, the power management module 188 may include a charging circuitry 210, a power adjuster 220, or a power gauge 230. The charging circuitry 210 may charge the battery 189 by using power supplied from an external power source outside the electronic device 101. According to an embodiment of the disclosure, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment of the disclosure, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment of the disclosure, at least some of the functions of the power management module 188 may be performed by an external control device (e.g., the processor 120).

The battery 189, according to an embodiment of the disclosure, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment of the disclosure, at least part of the charging state information or use state information regarding the battery 189 may be measured using a corresponding sensor (e.g., a temperature sensor) of the sensor module 176, the power gauge 230, or the power management module 188. According to an embodiment of the disclosure, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

Figure 3:
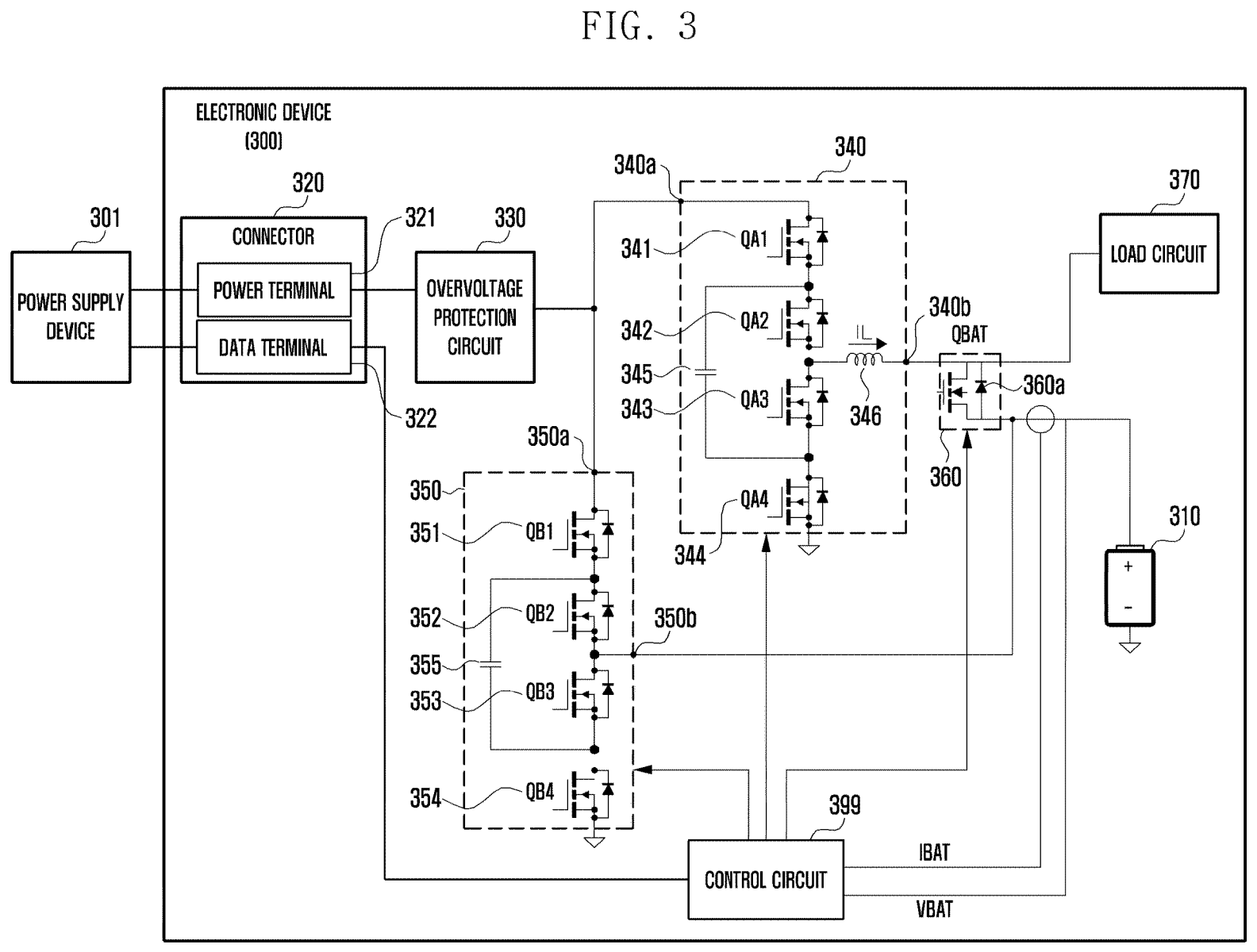

FIG. 3 is a block diagram illustrating an electronic device 300 configured to supply power to a load circuit 370 by using power received from a power supply device 301 and charge a battery 310 according to an embodiment of the disclosure.

Referring to FIG. 3, the electronic device 300 (for example, the electronic device 101 of FIG. 1) may include the battery 310, a connector 320, a overvoltage protection circuit 330, a first power conversion circuit 340, a second power conversion circuit 350, a battery switch 360, and the load circuit (or system) 370, a control circuit 399. The load circuit 370 collectively refers to electronic components driven using power signals received through the power conversion circuits 340 and 350 and/or power signals received from the battery 310 and may include, for example, a processor (for example, the processor 120 of FIG. 1), a display, and a camera.

The power supply device 301 (for example, the external electronic device 102 of FIG. 1) may include an adaptor (for example, a travel adaptor or a wall adaptor). For example, the adaptor may convert a current characteristic of a power signal from an external power source from an alternating current (AC) to a direct current (DC) and adjust a voltage of the power signal to a predetermined voltage value. The adaptor may perform a function (for example, programmable power supply (PPS)) of changing the current and the voltage according to the control of the electronic device 300 to receive the power signal. For example, the adaptor may decrease or increase the current of the power signal to be output to the electronic device 300 in response to a control signal received from the electronic device 300. The adaptor may decrease or increase the voltage of the power signal to be output to the electronic device 300 in response to the control signal received from the electronic device 300 through a cable. The adaptor may be a model which does not support the variable function and fixed the current and/or the voltage of the power signal to a predetermined value to output the value. When the adaptor is a model supporting the variable function, the adaptor of the power supply device 301 may change the voltage (or current) of the power signal to be output to the electronic device 300 to a voltage value (or current value) configured to charge the battery 310. When the adaptor is a model which does not support the variable function, the control circuit 399 (for example, the power management module 188 of FIGS. 1 and 2) may adjust the voltage (or current) of the power signal received from the power supply device 301 to a voltage value (or current value) configured to charge the battery 310.

The power supply device 301 may be electrically connected to the connector 320 of the electronic device 300 through a cable (for example, a USB cable). The power supply device 301 may output the power signal of which the voltage is adjusted by the adaptor and of which the current characteristic is converted to the DC to a power terminal 321 of the connector 320 through the cable. The power conversion circuits 340 and 350 may charge the battery 310 by using the power signal received from the power supply device 301 through the power terminal 321.

The connector 320 may be configured to perform data communication and power reception. The connector 320 may include the power terminal 321 for receiving a power signal from the power supply device 301 and a data terminal 322 for power delivery (PD) communication between the power supply device 301 and the electronic device 300. For example, the connector 320 may be configured as a socket according to universal serial bus (USB) Type-C and connected to a plug of the USB cable. Among pins of the USB Type-C socket, a VBUS pin may be used as the power terminal 321 and a configuration channel 1 (CC1) pin and/or a CC2 pin may be used as the data terminal 322.

The overvoltage protection circuit 330 may be connected to the power terminal 321 of the connector 320 and prevent damage of electronic components (for example, the power conversion circuits 340 and 350) by blocking inflow of the overvoltage into the electronic device 300. For example, the overvoltage protection circuit 330 may include a Zener diode.

The first power conversion circuit 340 and the second power conversion circuit 350 may convert the current value and/or the voltage value of the power signal received from the power terminal 321 through the overvoltage protection circuit 330 on the basis of the control of the control circuit 399. The first power conversion circuit 340 and the second power conversion circuit 350 may supply the converted power signal to the battery 310 and/or the load circuit 370.

The first power conversion circuit 340 may include a first input terminal 340a electrically connected to the power terminal 321 and a first output terminal 340b electrically connected to the load circuit 370 and the battery 310. For example, as illustrated, the first output terminal 340b may be directly connected to the load circuit 370, and the battery 310 may be electrically connected thereto through the battery switch 360. For example, power supply from the first output terminal 340b to the battery 310 is blocked when the battery switch 360 is in an open state, and power may be supplied from the first output terminal 340b to the battery 310 when the battery switch 360 is in a closed state. The battery switch 360 may be omitted from the configuration of the electronic device 300. That is, like the direct connection of the first output terminal 340b to the load circuit 370, the battery 310 may be directly connected thereto.

The first power conversion circuit 340 may operate in a switching charging mode (for example, a buck boost circuit) or a direct charging mode (for example, an switched capacitor voltage divider (SCVD)) on the basis of the control of the control circuit 399. The first power conversion circuit 340 is configured to be operable in two modes, and thus may be named a hybrid charging circuit.

When the power supply device 301 is a model which does not support the PPS function, the control circuit 399 may make a request for outputting the power signal to the power supply device 301 through the data terminal 322 and control the first power conversion circuit 340 to operate in the switching charging mode to convert the current value and/or the voltage value of the power signal received from the power supply device 301 according to a charging state of the battery 310.

When the first power conversion circuit 340 operates in the switching charging mode according to the control of the control circuit 399, the first power conversion circuit 340 may support constant current (CC) and constant voltage (CV) charging. For example, the control circuit 399 may measure a voltage "VBAT" of the battery 310 and a current "IBAT" flowing into the battery. The first power conversion circuit 340 may constantly maintain the IBAT as a charging current value configured by the control circuit 399 (or the processor) such that the VBAT increases up to a predetermined target voltage value while the charging mode is configured as the CC mode. The target voltage value may be the same as a voltage difference between positive (+) and negative (−) poles of the battery when the battery is in a full charge state. The full charge may mean a state of charge (SOC) when a charging rate of the battery reaches a maximum charging amount configured without fear of burning or explosion. When the VBAT reaches the target voltage value while the battery is charged, the charging mode may be switched to the CV mode. When the VBAT reaches the target voltage value and the charging mode is switched from the CC mode to the CV mode, the first power conversion circuit 340 may maintain the VBAT as the target voltage value by gradually decreasing the IBAT according to the control of the control circuit 399. When the IBAT decreases to a predetermined current value (for example, topoff current value) for complete charging while the battery 310 is charged in the CV mode, the first power conversion circuit 340 may complete charging of the battery 310 by stopping outputting the power signal to the battery 310 on the basis of the control of control circuit 399.

When the power supply device 301 is a model supporting the PPS function, the control circuit 399 may control the first power conversion circuit 340 to operate in the direct charging mode by converting the voltage value of the power signal to a fixed voltage conversion ratio (a ratio of the voltage value of the power signal output from the first power conversion circuit 340 to the voltage value of the power signal input into the first power conversion circuit 340) (for example, 2:1 (=50%)) and control the power supply device 301 to support the CC and CV modes through the data terminal 322.

When the first power conversion circuit 340 operates in the direct charging mode according to the control of the control circuit 399, the first power conversion circuit 340 may convert the voltage value and the current value of the power signal input into the first input terminal 340, but minimize power loss compared to the operation in the switching charging mode to quickly charge the battery 310. When the power loss of the first power conversion circuit 340 is ideally '0', a ratio of output power output from the first output terminal 340b of the first power conversion circuit 340 to input power input into the first input terminal 340a of the first power conversion circuit 340 may be '1'. For example, the first power conversion circuit 340 may distribute the voltage input into the first input terminal 340a by using one or more capacitors, so as to make the input voltage 1/N times (N being a natural number equal to or larger than 2) and output the voltage to the outside of the first output terminal 340b, and make the current input into the first input terminal 340a N times by using one or more capacitors and output the current to the outside of the first output terminal 340b.

According to an embodiment of the disclosure, the first power conversion circuit 340 may include QA1 341, QA2 342, QA3 343, and QA4 344 which are switches (for example, metal oxide semiconductor field effect transistor (MOSFET)) connected in series from the first input terminal 340a to the ground of the electronic device 300, a first capacitor (for example, a flying capacitor) 345, of which one end is connected to a point between QA1 341 and QA2 342 and the other end is connected to a point between QA3 343 and QA4 344, and an inductor 346, of which one end is connected to a point between QA2 342 and QA3 343 and the other end is connected to the first output terminal 340b, so as to support the direct charging mode and the switching charging mode. The second power conversion circuit 350 is described below.

Figure 4A:
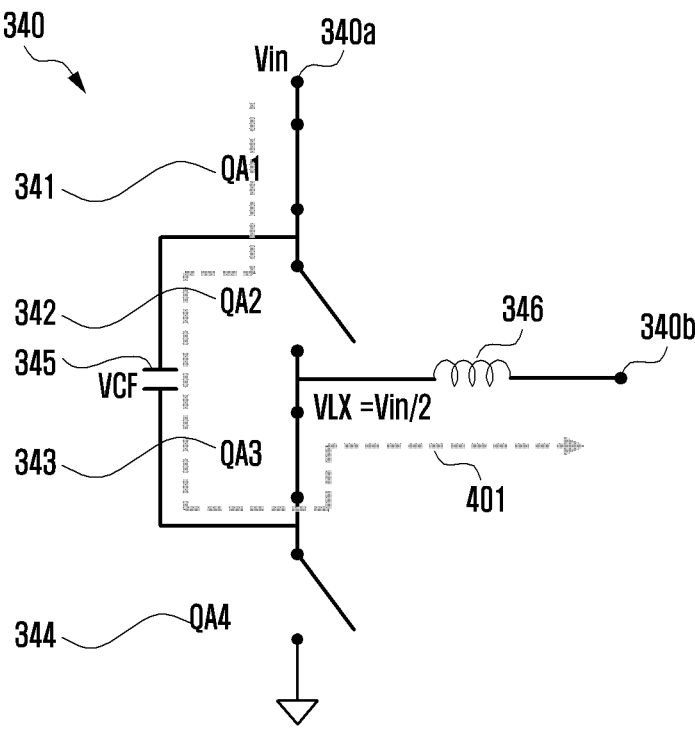
FIG. 4A illustrates a first switching state for charging a first capacitor in a first power conversion circuit and a power transmission path in the first switching state according to an embodiment of the disclosure.
Figure 4B:
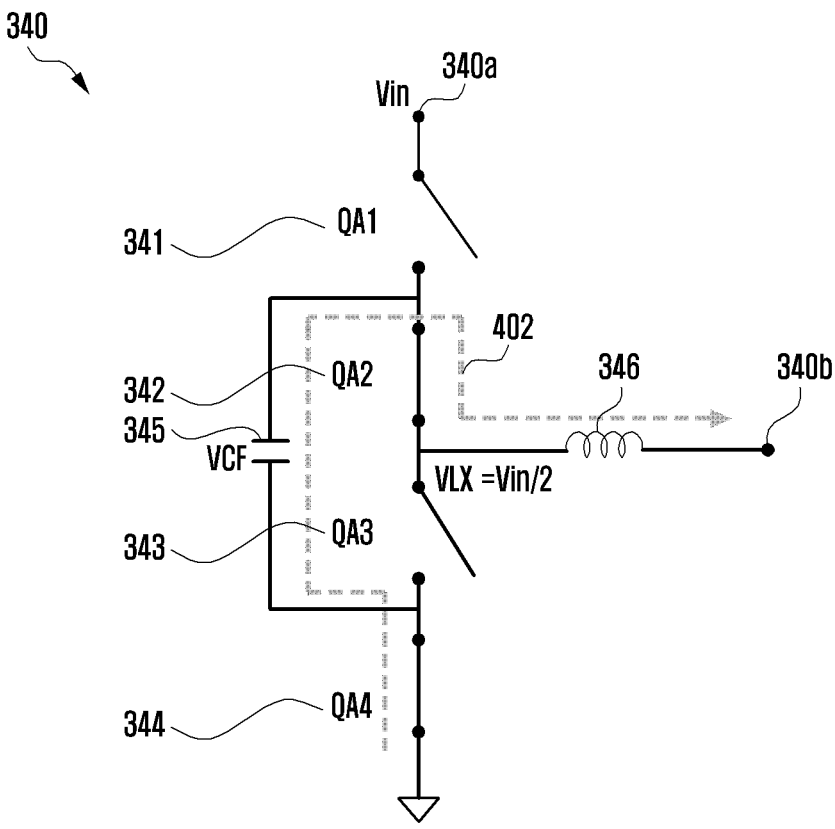
FIG. 4B illustrates a second switching state for discharging a first capacitor in a first power conversion circuit and a power transmission path in the second switching state according to an embodiment of the disclosure.
Figure 4C:
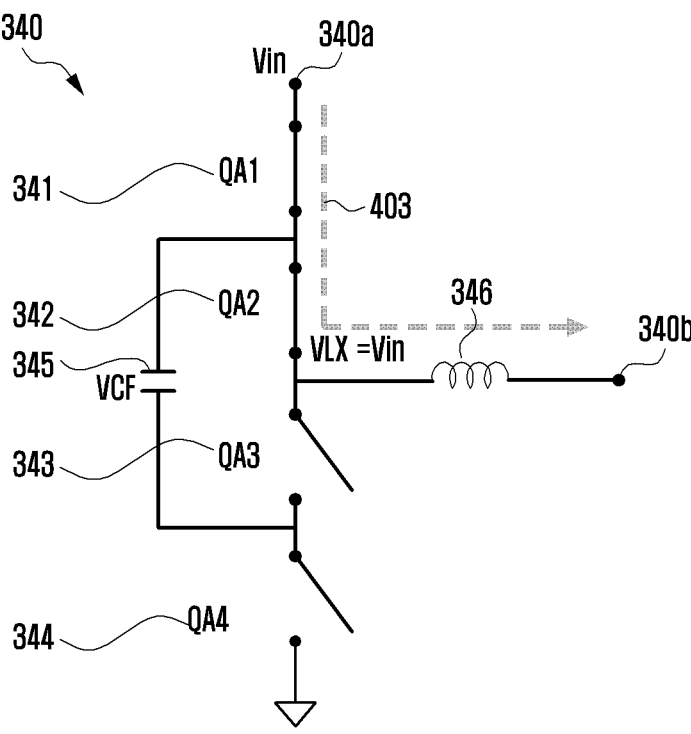
FIGS. 4C and 4D illustrate a third switching state and a fourth switching state for maintaining a first capacitor in a floating state in which the first capacitor is neither charged nor discharged according to various embodiments of the disclosure.
Figure 4D:
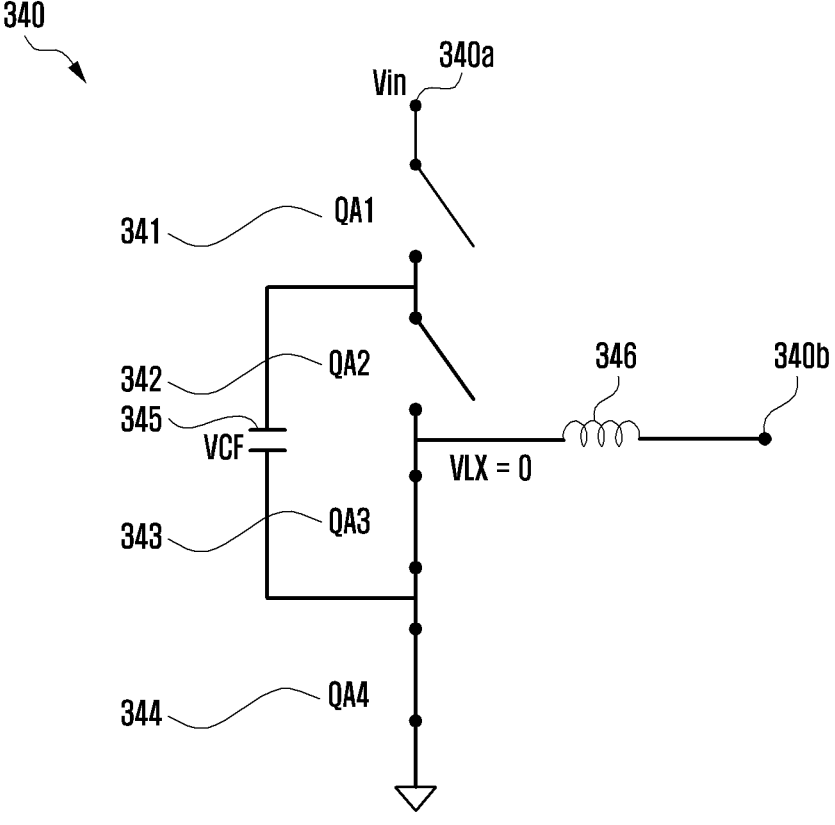
Figure 4E:
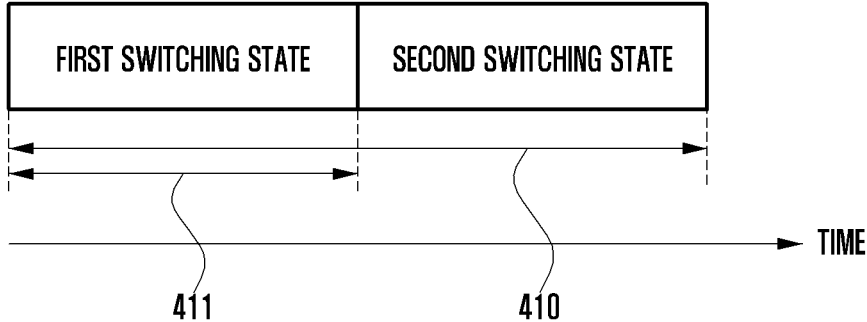
FIGS. 4E, 4F, and 4G illustrate a change of a switching state in a first power conversion circuit according to various embodiments of the disclosure.
Figure 4F:
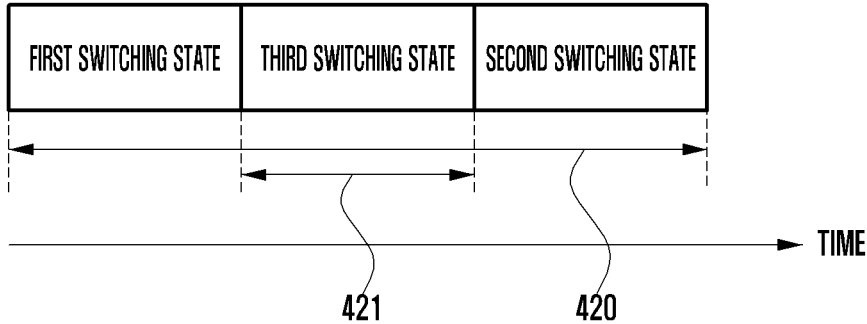
Figure 4G:
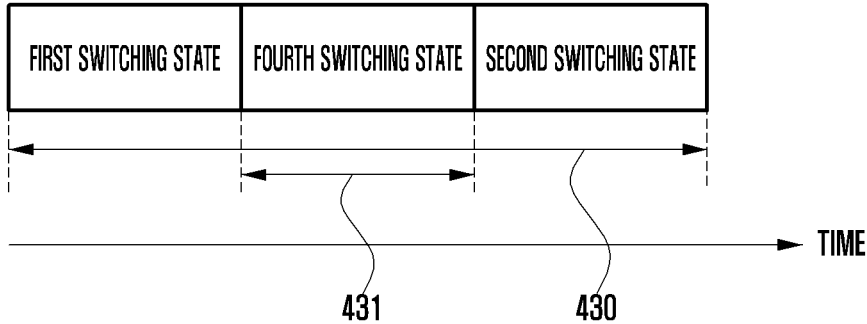

FIG. 4A illustrates a first switching state of a first power conversion circuit to charge a first capacitor and a power transmission path in a first switching state according to an embodiment of the disclosure. FIG. 4B illustrates a second switching state of a first power conversion circuit to discharge a first capacitor and a power transmission path in a second switching state according to an embodiment of the disclosure. FIGS. 4C and 4D illustrate a third switching state and a fourth switching state for maintaining a first capacitor in a floating state in which a first capacitor is neither charged nor discharged according to various embodiments of the disclosure. FIGS. 4E, 4F, and 4G illustrate conversion of a switching state of a first power conversion circuit 340 according to various embodiments of the disclosure.

Referring to FIG. 4A, the power signal inflowing into the first input terminal 340 may pass through QA1 341 and may be charged to the first capacitor 345 during a state in which QA1 341 and QA3 343 are closed (or turned on) and QA2 342 and QA4 344 are open (or turned off) (hereinafter, referred to as a first switching state). The power signal may be output from the first capacitor 345 to the second output terminal 340b via QA3 343 and the inductor 346. Accordingly, a current path 401 along which the power signal flows in the order of QA1 341, the first capacitor 345, QA3 343, and the inductor 346 may be configured in the first power conversion circuit 340. In the first switching state, the voltage is distributed by the first capacitor 345, and thus the relation of "VLX=Vin−VCF=Vin/2" may be established. Vin is an input voltage of the power signal flowing into the first input terminal 340a, VCF is a voltage of the first capacitor 345, and VLX is a voltage at a point connecting QA2 342 and QA3 343.

Referring to FIG. 4B, the power signal charging to the first capacitor 345 may be output to the second output terminal 340b via QA2 342 and the inductor 346 during a state in which QA1 341 and QA3 343 are open and QA2 342 and QA4 344 are closed (hereinafter, referred to as a second switching state). Accordingly, a current path 402 along which the current signal flows in the order of QA4 344, the first capacitor 345, QA2 342, and the inductor 346 may be configured in the first power conversion circuit 340. In the second switching state, the first capacitor 345 may be discharged, and thus the relation of "VLX=VCF=Vin/2" may be established.

Referring to FIG. 4C, the first capacitor 345 may remain in the floating state and the power signal flowing into the first input terminal 340a may be output to the second output terminal 340b via QA1 341 and QA2 342 during a state in which QA1 341 and QA2 342 are closed and QA3 343 and QA4 344 are open (hereinafter, referred to as a third switching state). Accordingly, a current path 403 along which the power signal flows in the order of QA1 341, QA2 342, and the inductor 346 may be configured in the first power conversion circuit 340. In the third switching state, the relation of "VLX=Vin" may be established.

Referring to FIG. 4D, the first capacitor 345 may remain in the floating state during a state in which both QA1 341 and QA2 342 are open (hereinafter, referred to as a fourth switching state). In the fourth switch state, the relation of "VLX=0" may be established. In the fourth switching state, both QA3 343 and QA4 344 may be in the open state or may be in the closed state as illustrated.

Referring to FIG. 4E, the control circuit 399 may control the first power conversion circuit 340 to alternate the first switching state and the second switching state. According to the control, the first power conversion circuit 340 may operate in the direct charging mode. In an embodiment of the disclosure, the control circuit 399 may control the first power conversion circuit 340 to periodically switch the first switching state and the second switching state by configuring a ratio of the duration 411 of the first switching state to one alternating cycle 410 in which the first switching state switches to the second switching state (for example, a duty rate or a duty cycle) as 50% and tuning a switching frequency for determining an alternating cycle 410 to a resonant frequency of the first capacitor 345 and the inductor 346. Accordingly, the first power conversion circuit 340 may operate as a direct charging circuit of which a voltage conversion ratio is fixed to about 50%.

The control circuit 399 may control the first power conversion circuit 340 to repeat the first switching state and the second switching state but switch from the first switching state to the second switching state via the third switching state or the fourth switching state. According to the control, the first power conversion circuit 340 may operate as a switching charging circuit capable of adjusting a voltage conversion ratio.

Referring to FIG. 4F, the control circuit 399 may control the first power conversion circuit 340 to switch from the first switching state to the third switching state and from the third switching state to the second switching state during one alternating cycle 420 in the state in which the switching frequency for determining the alternating cycle 420 is tuned to the resonant frequency of the first capacitor 345 and the inductor 346 or is configured as a frequency higher than the resonant frequency. Accordingly, the first power conversion circuit 340 may operate as a switching charging circuit for configuring a voltage conversion ratio to be higher than 50%. For example, the voltage output from the first output terminal 340b may be higher than Vin/2. As the duty cycle indicating a ratio of the time 421 during which the third switching state continues to one alternating cycle 420 is higher, the output voltage may be closer to Vin.

Referring to FIG. 4F, the control circuit 399 may control the first power conversion circuit 340 to switch from the first switching state to the fourth switching state and from the fourth switching state to the second switching state during one alternating cycle 430 in the state in which the switching frequency for determining the alternating cycle 430 is tuned to the resonant frequency of the first capacitor 345 and the inductor 346 or is configured as a frequency higher than the resonant frequency. Accordingly, the first power conversion circuit 340 may operate as a switching charging circuit for configuring a voltage conversion ratio to be lower than 50%. For example, the voltage output from the first output terminal 340b may be lower than Vin/2. As the duty cycle indicating a ratio of the time 431 during which the fourth switching state continues to one alternating cycle 430 is higher, the output voltage may be closer to 0.

Referring to FIG. 3, the second power conversion circuit 350 may include a second input terminal 350a electrically connected to the power terminal 321 and a second output terminal 350b electrically connected to the load circuit 370 and the battery 310. As illustrated, the second output terminal 350b may be directly connected to the battery 310, and the load circuit 370 may be electrically connected thereto through the battery switch 360. The battery switch 360 ("QBAT") may operate as a diode 360a for allowing the current in the direct from the battery 310 to the load circuit 370 and blocking the current flow in the direction from the first output terminal 340b to the battery 310. Accordingly, regardless of the battery switch 360, a discharging path along which power is supplied from the battery 310 to the load circuit 370 may be configured in the electronic device 300. The battery switch 360 may be omitted from the configuration of the electronic device 300. That is, as the second output terminal 350*b* is directly connected to the battery 310, the same may be directly connected to the load circuit 370.

The second power conversion circuit 350 may be configured to support the first power conversion circuit 340 to operate in a direct charging mode in which a voltage conversion ratio is fixed to about 50%. According to an embodiment of the disclosure, the second power conversion circuit 350 may include QB1 351 and QB2 352 which are switches (for example, MOSFET) connected from the second input terminal 350*a* to the second output terminal 350*b* in series, QB3 353 and QB4 354 which are switches (for example, MOSFET) connected from the second output terminal 350*b* to the ground of the electronic device 300 in series, and a second capacitor 355 (for example, a flying capacitor) of which one end is connected to a point between QB1 351 and QB2 352 and the other end is connected to a point between QB3 353 and QB4 354.

Figure 5A:
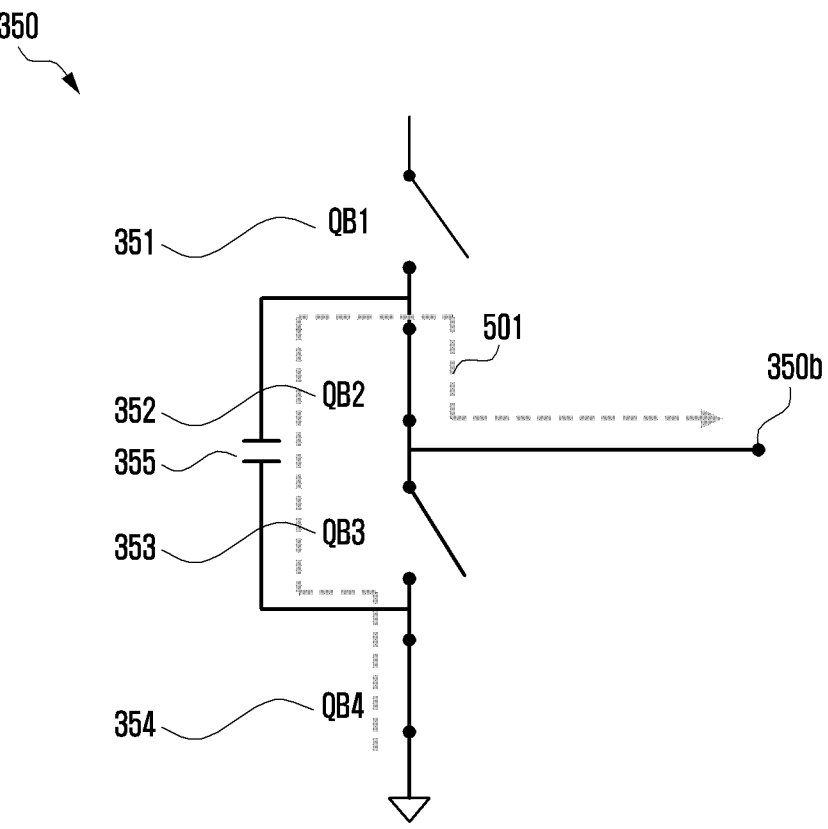
FIG. 5A illustrates a fifth switching state for discharging a second capacitor in a second power conversion circuit and a power transmission path in the fifth switching state according to an embodiment of the disclosure.
Figure 5B:
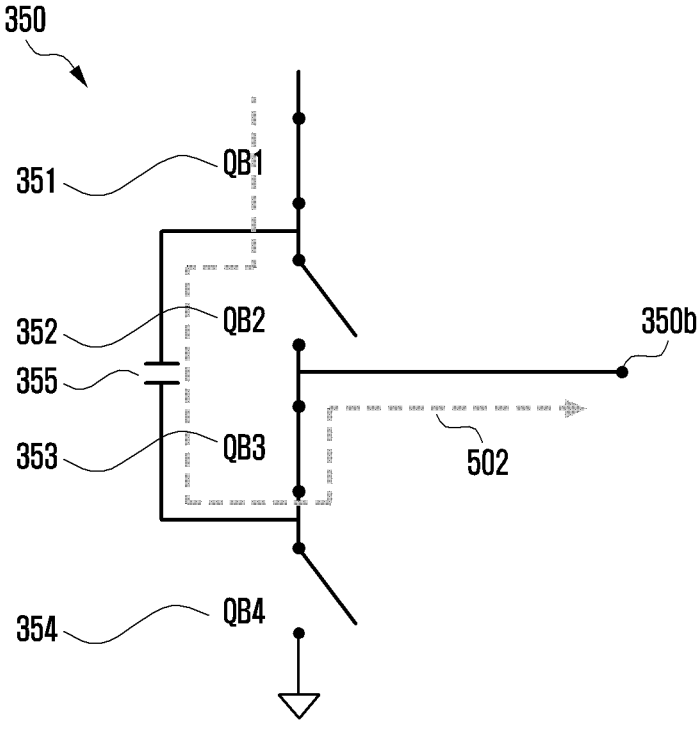
FIG. 5B illustrates a sixth switching state for charging a second capacitor in the second power conversion circuit and a power transmission path in the sixth switching state according to an embodiment of the disclosure.

FIG. 5A illustrates a fifth switching state for discharging a second capacitor in a second power conversion circuit and a power transmission path in the fifth switching state according to an embodiment of the disclosure. FIG. 5B illustrates a sixth switching state for charging a second capacitor in a second power conversion circuit and a power transmission path in the sixth switching state according to an embodiment of the disclosure.

Referring to FIG. 5A, the power signal may flow in the order of QB4 354, the second capacitor 355, and QB2 352, and a current path 501 for the output to the outside through the second output terminal 350*b* may be configured in the second power conversion circuit 350 during a state in which QB1 351 and QB3 353 are open and QA2 352 and QA4 345 are closed (hereinafter, referred to as a fifth switching state).

Referring to FIG. 5B, the power signal may flow in the order of QB1 351, the second capacitor 355, and QB3 353, and a current path 502 for the output to the outside through the second output terminal 350*b* may be configured in the second power conversion circuit 350 during a state in which QB1 351 and QB3 353 are closed and QB2 352 and QB4 345 are open (hereinafter, referred to as a sixth switching state).

The control circuit 399 may remove or minimize ripple (AC component) of the power signal output from the first power conversion circuit 340 by controlling the power conversion circuits 340 and 350 in an interleaving scheme. The interleaving scheme may simultaneously output a first switching control signal for operating the control circuit 399 in a direct charging mode to the first power conversion circuit 340 and output a second switching control signal having the same frequency as the first switching control signal but a phase difference of 180 degrees to the second power conversion circuit 350. For example, the control circuit 399 may output the first switching control signal having a switching frequency which is the same as the resonant frequency of the first capacitor 345 and the inductor 346 and a duty cycle fixed to 50% and making the first power conversion circuit 340 alternate the first switching state and the second switching state to the first power conversion circuit 340. Simultaneously with outputting the first switching control signal to the first power conversion circuit 340, the control circuit 399 may output, to the second power conversion circuit 350, the second switching control signal for making the second power conversion circuit 350 be in the fifth switching state when the control circuit 399 has a frequency which is the same as the first switching control signal and the first power conversion circuit 340 is in the first switching state and making the second power conversion circuit 350 be in the sixth switching state when the first power conversion circuit 340 is in the second switching state.

The control circuit 399 may identify the type of an external device connected to the connector 320. For example, on the basis of data received from the external device through the data terminal 322, the control circuit 399 may identify whether the external device is the power supply device 301 for supplying power, whether the power supply device 301 is a model supporting the PPS function, and a fixed voltage value of the power signal output from the power supply device 301 when the power supply device 301 is a model which does not support the PPS function. The control circuit 399 may perform power delivery (PD) communication for charging the battery 310 on the basis of identification information. For example, the control circuit 399 may perform an operation of negotiating about which is a source for supplying power and which is a sink for receiving power among the external device and the electronic device 300 by performing PD communication with the external device through the data terminal 322. When the electronic device 300 is determined as the sink (power reception device) and the external device is determined as the source (power supply device 301), the control circuit 399 may perform an operation of negotiating about a current value and/or a voltage value of the power signal to be supplied by the power supply device 301 by performing PD communication with the power supply device 301 through the data terminal 322. The control circuit 399 may transmit identification information of the external device to the processor. Accordingly, the negotiation and/or the control for the power conversion circuits 340 and 350 may be performed by the processor instead of the control circuit 399 on the basis of the received identification information.

The control circuit 399 may deactivate the second power conversion circuit 350 while the first power conversion circuit 340 operates in the switching charging mode. For example, the control circuit 399 may open QB1 351 (or QB3 353 and QB4 354) while the first power conversion circuit 340 operates in the switching charging mode.

The electronic device 300 may have much power consumption to execute an application (for example, game) requiring high-specification performance. Internal temperature of the battery which is being charged may be aggravated by heat generated due to much power consumption. According to an embodiment of the disclosure, a pass through mode (or a low heating mode) for suppressing an increase in internal temperature may be executed in the electronic device 300.

The control circuit 399 may operate the electronic device 300 in the pass through mode in which power supply to the battery 310 is paused and power is supplied to the load circuit 370. The control circuit 399 may deactivate the second power conversion circuit 350 and control the first power conversion circuit 340 to operate in the direct charging mode during the pass through mode. Further, the control circuit 399 may open the battery switch 360 so that power is not supplied from the first power conversion circuit 340 to the battery 310. As described above, an increase in internal temperature of the battery 310 can be suppressed as the battery charging is paused during the pass through mode. In the state in which the pass through mode is in a deactivated mode, the control circuit 399 may close the battery switch 360.

The pass through mode may be activated when a predetermined event is generated. The predetermined event corresponds to the performance of the pass through mode, and may be, for example, an event (for example, a user input) making a request for executing a specific application (for example, game) or the execution of the specific application in the electronic device 300. A type of the power supply device 301 may be considered as a condition for performing the pass through mode. For example, when the power supply device 301 is a model supporting the PPS function or a model which does not support the PPS function but is recognized as a model which outputs a power signal of a fixed output voltage (for example, about double the full charge voltage (for example, 4.4 to 4.5 V) of the batter 310) and the event is generated, the control circuit 399 may operate the electronic device 300 in the pass through mode. An SOC may be considered as an additional condition for performing the pass through mode. For example, the SOC (or a charging rate) may be digitalized into a percentage, and, when the SOC is higher than or equal to a predetermined rate (for example, 20%), the control circuit 399 may perform the pass through mode. The processor may display a menu for enabling the user to configure whether to activate the pass through mode on the display. For example, when the electronic device 300 is always connected to the adaptor (for example, a display product in a store), it may be worrying about the risk of excessive charge of the battery and battery damage (for example, swelling) according thereto. In this case, the electronic device 300 may be configured to operate in the pass through mode, and thus overcharging may be prevented. The processor may store configuration information indicating whether to activate, configured through the configuration menu, in the memory. When a predetermined event is generated, the processor may identify whether the pass through mode is activated on the basis of the configuration information. When the activation is configured on the basis of the identification result, the processor may make a request for performing the pass through mode to the control circuit 399. When the deactivation is configured, the pass through mode may not be performed event through the predetermined event is generated.

The control circuit 399 may control the first power conversion circuit 340 to operate in a quasi direction charging mode for finely adjusting a voltage conversion ratio (for example, perform fine adjustment at 50%). For example, the control circuit 399 may synchronize the switching frequency of the first power conversion circuit 340 with the resonant frequency of the first capacitor 345 and the inductor 346 or configure the switching frequency to be higher. The control circuit 390 may finely adjust the voltage conversion ratio to be higher than 50% by controlling the first power conversion circuit 340 to switch from the first switching state to the second switching state via the third switching state. The control circuit 390 may finely adjust the voltage conversion ratio to be lower than 50% by controlling the first power conversion circuit 340 from the first switching state to the second switching state via the fourth switching state. When the first power conversion circuit 340 switches from the first switching state to the second switching state, the control circuit 399 may control the second power conversion circuit 350 to switch from the fifth switching state to the sixth switching state. Through such a control operation, the current value and/or the voltage value of the power signal supplied to the battery 310 may be changed. When the power supply device 301 is a model which does not support the PPS function but is recognized as a model which outputs a power signal of a fixed output voltage about twice as much as the full charge voltage (for example, 4.4 to 4.5 V) of the battery 310, the quasi direct charging mode may be activated.

Figure 6:
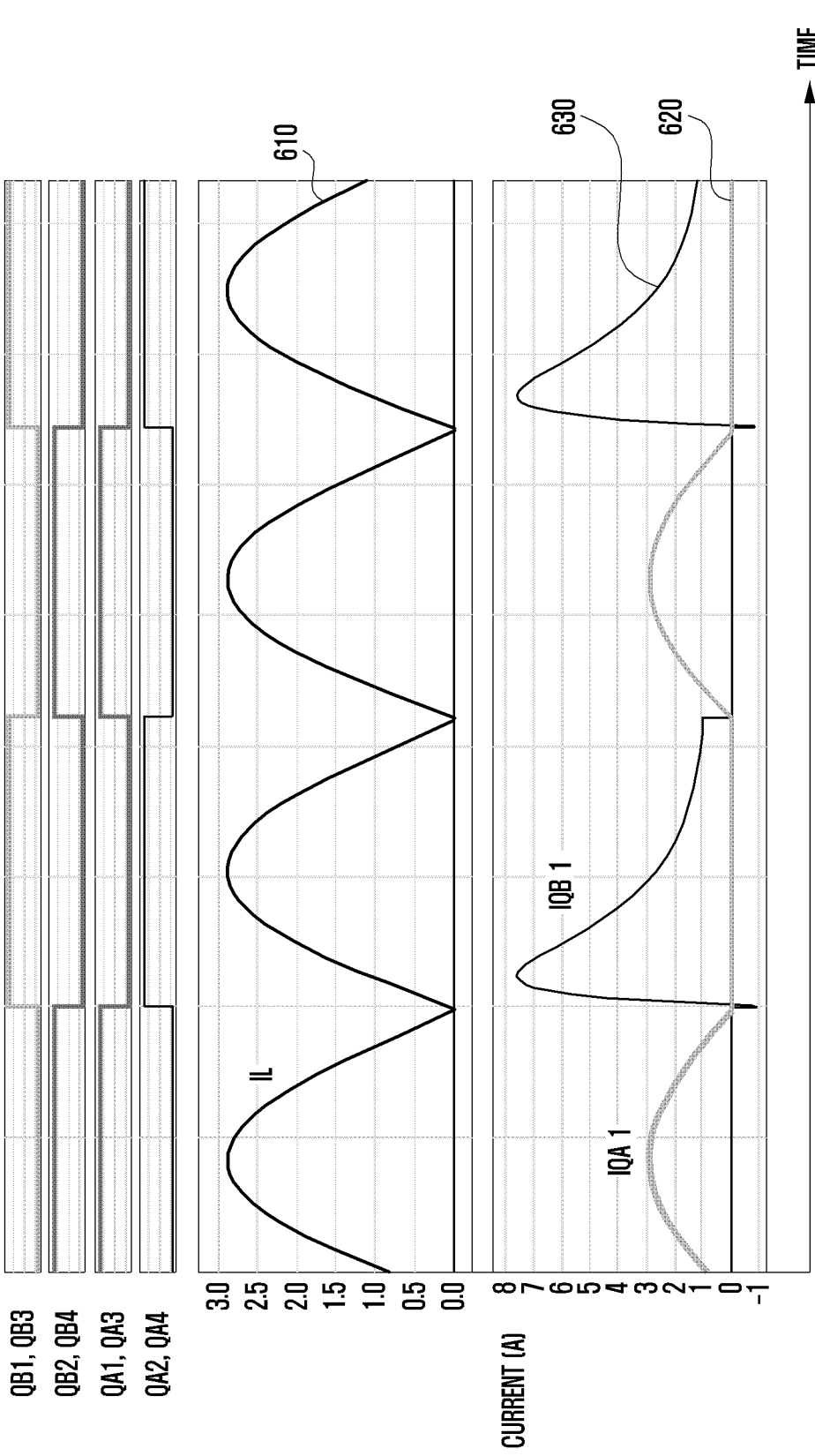
FIG. 6 illustrates waveforms of a current in power conversion circuits while a power supply device operates in a CC mode and an electronic device operates in a direct charging mode according to an embodiment of the disclosure.

FIG. 6 illustrates waveforms of a current in power conversion circuits while a power supply device operates in a constant current (CC) mode and an electronic device operates in a direct charging mode according to an embodiment of the disclosure.

Referring to FIG. 6, a first current waveform 610 indicates the current "IL" of a power signal output from the first power conversion circuit 340. A second current waveform 620 indicates the current "IQA1" of a power signal passing through QA1 341 in the first power conversion circuit 340. A third current waveform 630 indicates the current "IQB1" of a power signal passing through QB1 351 in the second power conversion circuit 350. By resonance of the first capacitor 345 and the inductor 346, the current in the first power conversion circuit 340 may have a sine wave form having relative small loss in switching. For example, IQA1 and IL may have the sine wave form starting at '0' and ending at '0' in every time point at which the switching state is changed. Ripple may be removed or minimized from IL by a power signal output from the second power conversion circuit 350. The power signal from which ripple is removed (or minimized) may be supplied to the battery 310 and the load circuit 370.

Figure 7:
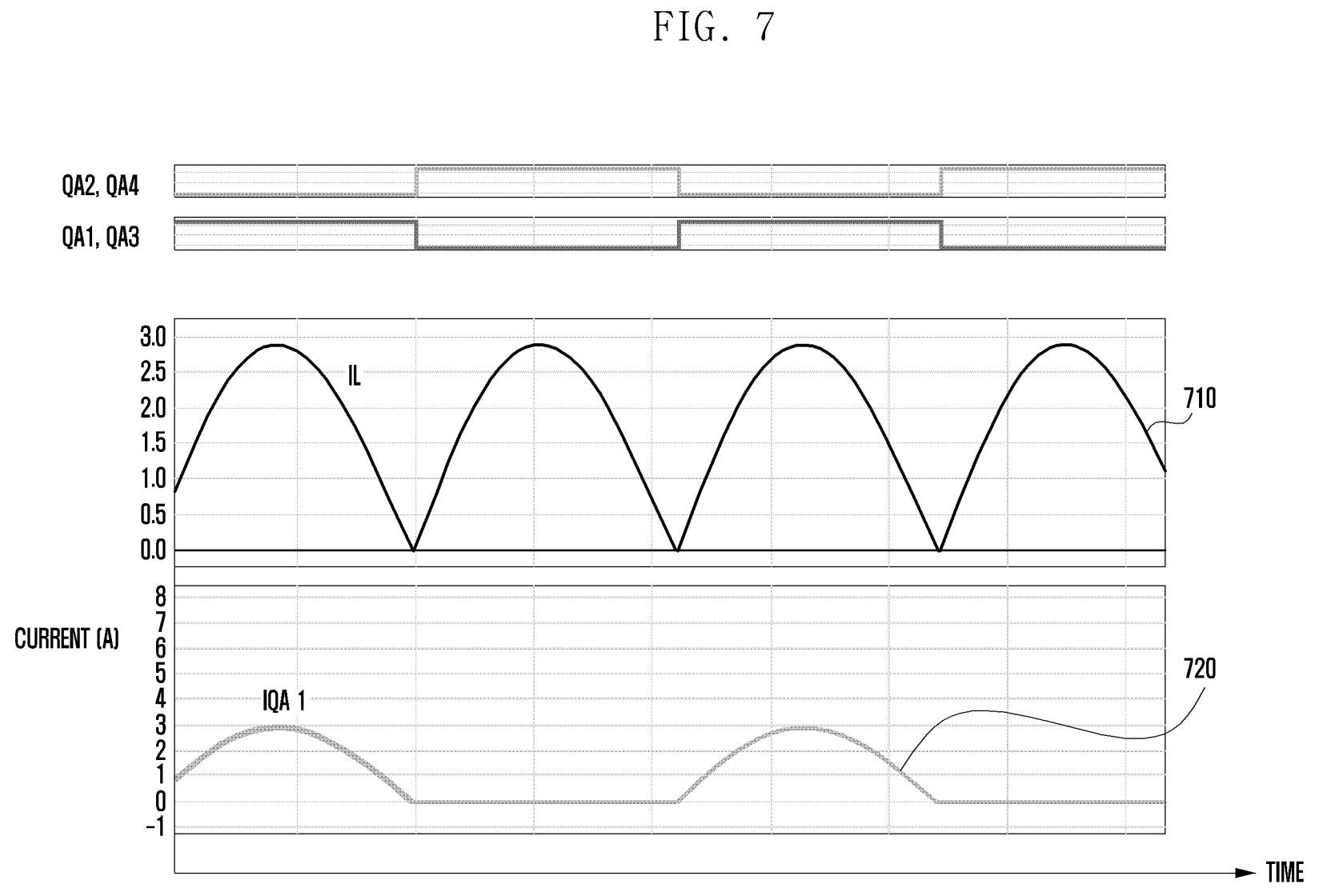

FIG. 7 illustrates waveforms of a current in a first power conversion circuit while an electronic device operates in a pass through mode according to an embodiment of the disclosure.

Referring to FIG. 7, a first current waveform 710 indicates the current "IL" of a power signal output from the first power conversion circuit 340. A second current waveform 720 indicates the current "IQA1" of a power signal passing through QA1 341 in the first power conversion circuit 340. IQA1 and IL may have the sine wave form starting at '0' and ending at '0' in every time point at which the switching state is changed by resonance of the first capacitor 345 and the inductor 346.

Figure 8:
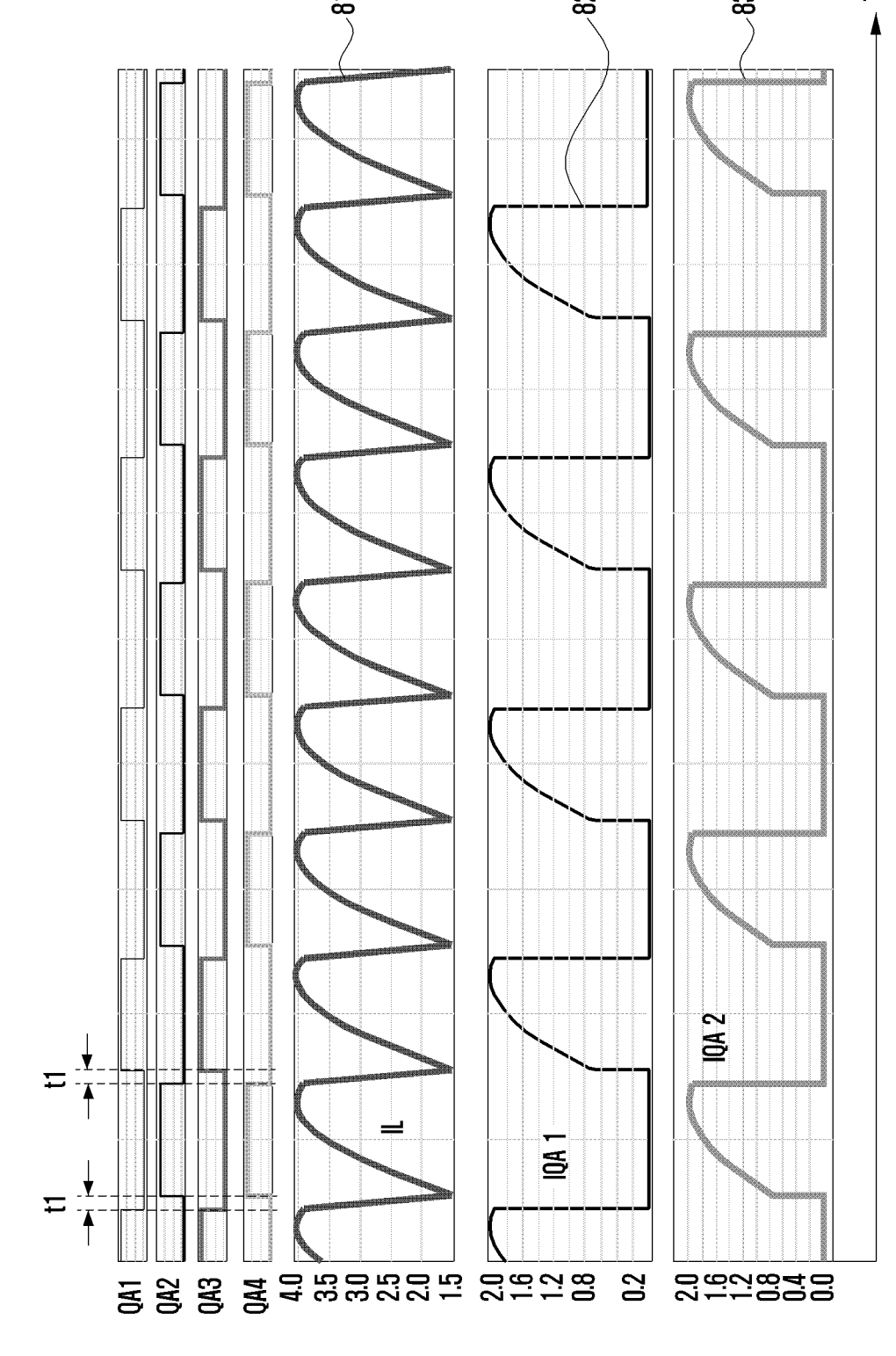
FIG. 8 illustrates waveforms of a current in a first power conversion circuit while an electronic device operates in a switching charging mode according to an embodiment of the disclosure.

FIG. 8 illustrates waveforms of a current in a first power conversion circuit while an electronic device operates in a switching charging mode according to an embodiment of the disclosure.

Referring to FIG. 8, a first current waveform 810 indicates the current "IL" of a power signal output from the first power conversion circuit 340. A second current waveform 820 indicates the current "IQA1" of a power signal passing through QA1 341 in the first power conversion circuit 340. A third current waveform 830 indicates the current "IQA2" of a power signal passing through QA2 342 in the first power conversion circuit 340. The switching frequency of the first power conversion circuit 340 may be configured to be higher than the resonant frequency of the first capacitor 345 and the inductor 346 and, accordingly, IQA1, IQA2, and IL may have the form in which a linear increase appears during at least some intervals from a time point at which the switching state is changed, rather than the sine wave form.

In the switching charging mode, the state change from the first switching state to the second switching state may be made via the third switching state or the fourth switching state. For example, the control circuit 399 may switch the first power conversion circuit 340 from the first switching state to the fourth switching state in which both QA1 341 and QA2 342 are open. The control circuit 399 may maintain the fourth switching state for a predetermined time "t1" and, when t1 passes, switch the first power conversion circuit 340 from the fourth switching state to the second switching state. According to the state change, the voltage conversion ratio may be maintained to be lower than 50% in the first power conversion circuit 340. As 't1' is longer, the voltage conversion ratio may be configured to be lower.

Figure 9:
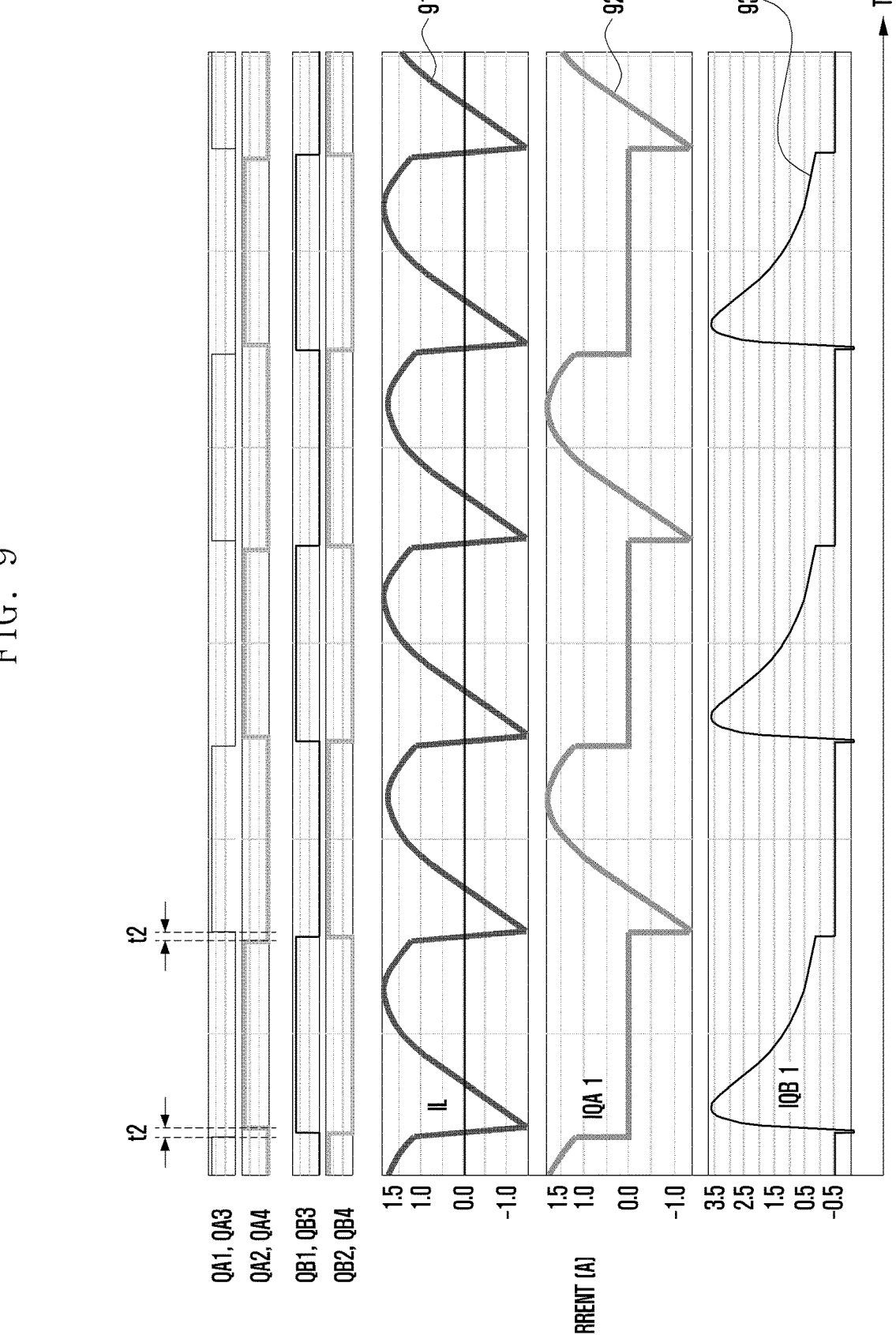
FIG. 9 illustrates waveforms of a current in a power conversion circuits while an electronic device operates in a quasi-direct charging mode according to an embodiment of the disclosure.

FIG. 9 illustrates waveforms of a current in power conversion circuits while an electronic device operates in a quasi-direct charging mode according to an embodiment of the disclosure.

Referring to FIG. 9, a first current waveform 910 indicates the current "IL" of a power signal output from the first power conversion circuit 340. A second current waveform 920 indicates the current "IQA1" of a power signal passing through QA1 341 in the first power conversion circuit 340. A third current waveform 930 indicates the current "IQB1" of a power signal passing through QB1 351 in the second power conversion circuit 350.

In the quasi direct charging mode, the state change from the first switching state to the second switching state may be made via the third switching state or the fourth switching state. For example, the control circuit 399 may switch the first power conversion circuit 340 from the first switching state to the fourth switching state in which both QA1 341 and QA2 342 are open. The control circuit 399 may maintain the fourth switching state for a predetermined time 't2' and, when t2 passes, switch the first power conversion circuit 340 from the fourth switching state to the second switching state. When the first power conversion circuit 340 switches from the fourth switching state to the second switching state or within the time t2, the control circuit 399 may switch the second power conversion circuit 350 from the fifth switching state to the sixth switching state. According to the state change, the voltage conversion ratio in the first power conversion circuit 340 may be finely adjusted to be lower than 50%.

Figure 10:
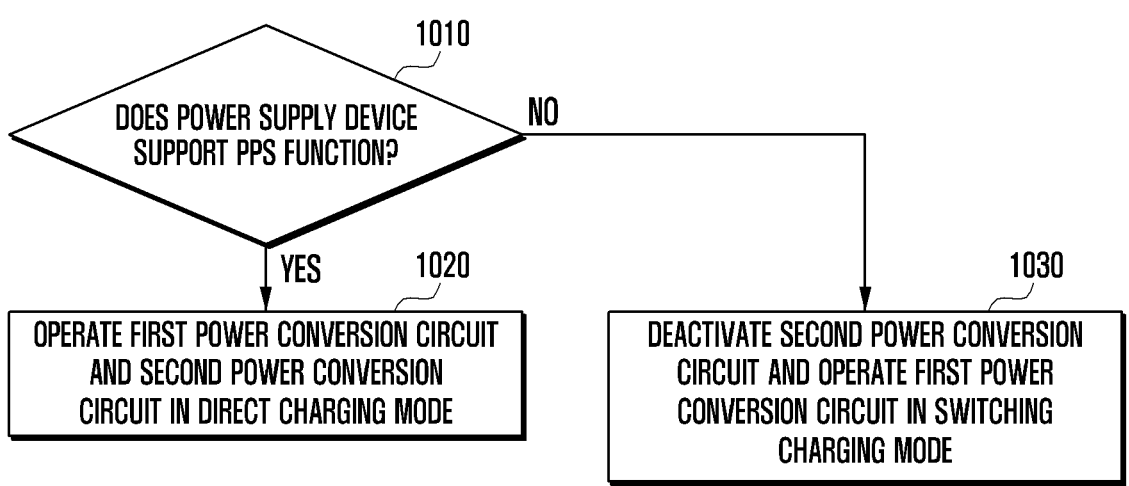
FIG. 10 is a flowchart illustrating operations for supplying power to a battery and a load circuit according to an embodiment of the disclosure.

FIG. 10 is a flowchart illustrating operations for supplying power of a battery and a load circuit according to an embodiment of the disclosure.

Referring to FIG. 10, in operation 1010, the control circuit 399 may identify whether the power supply device 301 connected to the connector 320 supports the PPS function through data communication with the power supply device 301.

When it is identified that the power supply device 301 is the model supporting the PPS function, the control circuit 399 may operate the first power conversion circuit 340 and the second power conversion circuit 350 in the direct charging mode in operation 1020. For example, the control circuit 399 may simultaneously output a first switching control signal having the same switching frequency as the resonant frequency of the first capacitor 345 and the inductor 346 and having a duty cycle of 50% to the first power conversion circuit 340 and output a second switching control signal having the same switching frequency and duty cycle but a phase difference of 180 degrees to the second power conversion circuit 350.

When it is identified that the power supply device 301 is the model which does not support the PPS function, the control circuit 399 may deactivate the second power conversion circuit 350 and operate the first power conversion circuit 340 in the switching charging mode in operation 1030. For example, the control circuit 399 may output a third switching control signal having a frequency that is the same as or higher than the resonant frequency of the first capacitor 345 and the inductor 346 to the first power conversion circuit

340. The third switching control signal may make QA1 341 and QA2 342 have the same duty cycle and a phase difference of 180 degrees. For example, a duration time of the closed state of QA1 341 is the same as a duration time of the closed state of QA2 342 in one cycle of the third switching control signal, but QA2 342 may be in the open state when QA1 341 is in the closed state. The third switching control signal may make QA1 341 and QA4 344 have the complementary relation. For example, QA4 344 is open when QA1 341 is closed, and QA4 344 is closed when QA1 341 is open. The third switching control signal may make QA2 342 and QA3 also have the complementary relation. The control circuit 399 may monitor the charging state of the battery 310 and make the third switching control signal have the third switching state or the fourth switching state on the basis of the monitoring result. For example, when VBAT exceeds a target voltage value (for example, a full charge voltage value of the battery 310), the control circuit 399 may output the third switching control signal alternating the first switching state and the second switching state via the third switching state to the first power conversion circuit 340. The control circuit 399 may control a ratio of the duration time of the third switching state to the cycle of the third switching control signal on the basis of the monitoring result. When VBAT is lower than the target voltage value, the control circuit 399 may output the third switching control signal alternating the first switching state and the second switching state via the fourth switching state to the first power conversion circuit 340. The control circuit 399 may control a ratio of the duration time of the fourth switching state to the cycle of the third switching control signal on the basis of the monitoring result.

Figure 11:
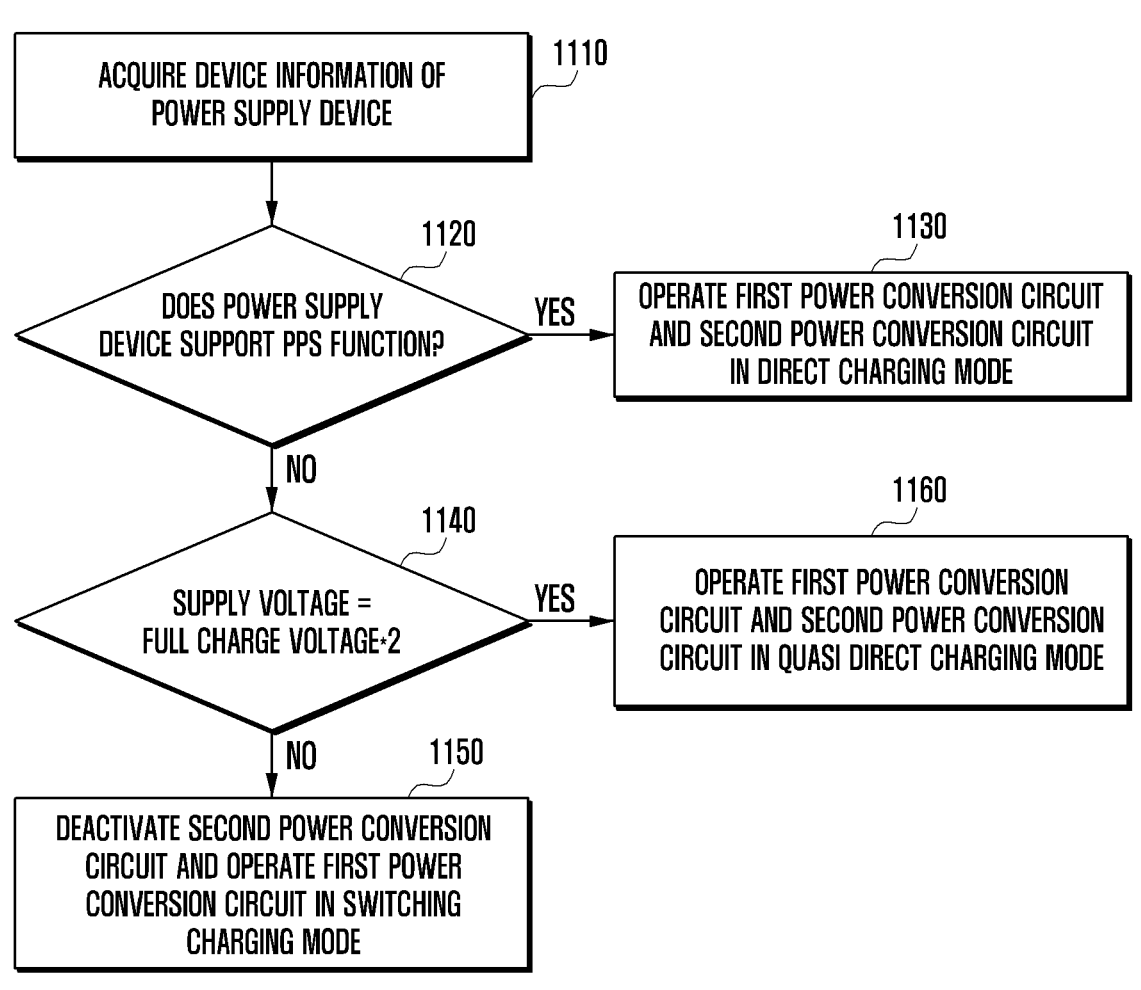
FIG. 11 is a flowchart illustrating operations for supplying power to a battery and a load circuit according to an embodiment of the disclosure.

FIG. 11 is a flowchart illustrating operations for supplying power of a battery and a load circuit according to an embodiment of the disclosure.

Referring to FIG. 11, in operation 1110, the control circuit 399 may acquire device information of the power supply device 301 connected to the connector 320 through data communication with the power supply device 301.

In operation 1120, the control circuit 399 may identify whether the power supply device 301 connected to the connector 320 supports the PPS function in the device information.

When it is identified that the power supply device 301 is the model supporting the PPS function, the control circuit 399 may operate the first power conversion circuit 340 and the second power conversion circuit 350 in the direct charging mode in operation 1130. For example, the control circuit 399 may simultaneously output a first switching control signal having the same switching frequency as the resonant frequency of the first capacitor 345 and the inductor 346 and having a duty cycle of 50% to the first power conversion circuit 340 and output a second switching control signal having the same switching frequency and duty cycle but a phase difference of 180 degrees to the second power conversion circuit 350.

When it is identified that the power supply device 301 is the model which does not support the PPS function, the control circuit 399 may identify whether a voltage value which can be supplied by the power supply device 301 is about twice the full charge voltage vale of the battery 310 (for example, the power supply device 301 supports 9 V and the full charge voltage is 4.4 to 4.5 V) through the device information in operation 1140.

When it is identified that the power supply device 301 is the model which does not support the PPS function and the voltage value which can be supplied by the power supply device 301 is not twice the full charge voltage value of the battery 310, the control circuit 399 may deactivate the second power conversion circuit 350 and operate the first power conversion circuit 340 in the switching charging mode in operation 1150. For example, the control circuit 399 may output the third switching control signal having the frequency which is the same as or higher than the resonant frequency of the first capacitor 345 and the inductor 346 and making QA1 341 and QA2 342 have the same duty cycle and a phase difference of 180 degrees, QA1 341 and QA4 344 have the complementary relation, and QA2 342 and QA3 343 have the complementary relation to the first power conversion circuit 340. The control circuit 399 may monitor the charging state of the battery 310 and make the third switching control signal have the third switching state or the fourth switching state on the basis of the monitoring result.

When it is identified that the power supply device 301 is the model which does not support the PPS function and the voltage value which can be supplied by the power supply device 301 is about twice the full charge voltage value of the battery 310, the control circuit 399 may operate the first power conversion circuit 340 and the second power conversion circuit 350 in the quasi direct charging mode in operation 1160. For example, the control circuit 399 may output the fourth switching control signal having the switching frequency which is the same as or higher than the resonant frequency of the first capacitor 345 and the inductor 346 and making QA1 341 and QA2 342 have the same duty cycle and a phase difference of 180 degrees, QA1 341 and QA4 344 have the complementary relation, and QA2 342 and QA3 343 have the complementary relation to the first power conversion circuit 340. Simultaneously, the control circuit 399 may output a fifth switching control signal having the same switching frequency as the fourth switching control signal, a duty cycle of 50%, and a phase difference of 180 degrees from the fourth switching control signal to the second power conversion circuit 350. The control circuit 399 may monitor the charging state of the battery 310 and make the fourth switching control signal have the third switching state or the fourth switching state on the basis of the monitoring result. For example, when VBAT exceeds the target voltage value (for example, the full charge voltage value of the battery 310), the control circuit 399 may output the fourth switching control signal alternating the first switching state and the second switching state via the third switching state to the first power conversion circuit 340. The control circuit 399 may control a ratio of the duration time of the third switching state to the cycle of the fourth switching control signal on the basis of the monitoring result. When VBAT is lower than the target voltage value, the control circuit 399 may output the fourth switching control signal alternating the first switching state and the second switching state via the fourth switching state to the first power conversion circuit 340. The control circuit 399 may control a ratio of the duration time of the fourth switching state to the cycle of the third switching control signal on the basis of the monitoring result.

Figure 12:
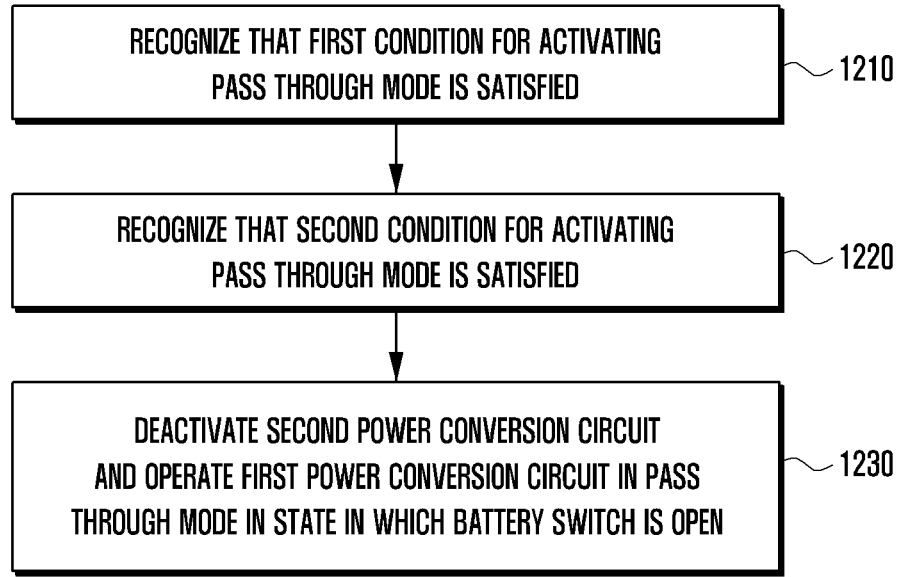
FIG. 12 is a flowchart illustrating operations for stopping power supply to a battery and supplying power to a load circuit according to an embodiment of the disclosure.

FIG. 12 is a flowchart illustrating operations for stopping power supply to a battery and supplying power to a load circuit according to an embodiment of the disclosure.

Referring to FIG. 12, in operation 1210, the control circuit 399 may recognize that a first condition for activating a pass through mode is satisfied. For example, the control circuit 399 may recognize, as the first condition, that the power supply device 301 is the model supporting the PPS function or the model which does not support the PPS function but is a model which outputs a power signal of a fixed output voltage that is twice of the full charge voltage value of the battery 310 (for example, 4.5 V) through data communication with the power supply device 301.

In operation 1220, the control circuit 399 may recognize that a second condition for activating a pass through mode is satisfied. For example, the control circuit 399 may recognize the generation of a specific event (for example, execution of the specific application or a user input making a request for executing the specific event or activating the pass through mode) as the second condition.

As the first condition and the second condition are satisfied, the control circuit 399 may deactivate the second power conversion circuit 350 and operate the first power conversion circuit 340 in the pass through mode while the battery switch 360 is open in operation 1230. For example, the control circuit 399 may output a first switching control signal having the same switching frequency as the resonant frequency of the first capacitor 345 and the inductor 346 and a duty cycle of 50% to the first power conversion circuit 340.

A battery charging rate may be considered as an additional condition for activating the pass through mode. For example, when the charging rate is lower than a predetermined rate even though the first condition and the second condition are satisfied, the control circuit 399 may deter activation of the pass through mode. When the charging rate is higher than or equal to a predetermined rate, the control circuit 399 may activate the pass through mode.

The control circuit 399 may recognize the generation of a specific event (for example, termination of execution of the specific application or a user input making a request for deactivating the pass through mode) for deactivating the pass through mode. As the specific event for deactivating the pass through mode is generated, the control circuit 399 may close the battery switch 360 and operate the first power conversion circuit 340 and the second power conversion circuit 350 in a direct charging mode or a quasi direct charging mode (for example, operation 1130 or operation 1160 of FIG. 11).

According to an embodiment of the disclosure, a portable electronic device (for example, the electronic device 300 of FIG. 3) may include a connector (for example, the connector 320) including a power terminal and a data terminal; a first power conversion circuit (for example, the first power conversion circuit 340); a second power conversion circuit (for example, the second power conversion circuit 350); and a control circuit (for example, the control circuit 399) electrically connected to the data terminal, the first power conversion circuit, and the second power conversion circuit. The first power conversion circuit may include: a first input terminal connected to the power terminal; a first output terminal connected to a load circuit and a battery of the portable electronic device; a switch 1-1, a switch 1-2, a switch 1-3, and a switch 1-4 connected in series from the first input terminal to a ground of the portable electronic device; an inductor having one end connected to a point between the switch 1-2 and the switch 1-3 and the other end connected to the first output terminal; and a first capacitor having one end connected to a point between the switch 1-1 and the switch 1-2 and the other end connected to a point between the switch 1-3 and the switch 1-4. The second power conversion circuit may include: a second input terminal connected to the power terminal; a second output terminal connected to the load circuit and the battery; a switch 2-1 and a switch 2-2 connected in series from the second input terminal to the second output terminal; a switch 2-3 and a switch 2-4 connected in series from the second output terminal to the ground; and a second capacitor having one end connected to a point between the switch 2-1 and the switch 2-2 and the other end connected to a point between the switch 2-3 and the switch 2-4. The control circuit may be configured to identify whether a power supply device connected to the connector supports a programmable power supply (PPS) function through the data terminal. The control circuit may be configured to, in case that it is identified that the power supply device supports the PPS function, output a first switching control signal having a switching frequency equal to a resonant frequency of the first capacitor and the inductor and a duty cycle of 50% and alternating a first switching state in which the switch 1-1 and the switch 1-3 are closed and the switch 1-2 and the switch 1-4 are open and a second switching state in which the switch 1-1 and the switch 1-3 are open and the switch 1-2 and the switch 1-4 are closed to the first power conversion circuit and output a second switching control signal having a switching frequency and a duty cycle, which are identical to the switching frequency and the duty cycle of the first switching control signal but a phase difference of 180 degrees from the first switching control signal to the second power conversion circuit. The control circuit may be configured to, in case that it is identified that the power supply device does not support the PPS function, deactivate the second power conversion circuit and output a third switching control signal having a switching frequency equal to or higher than the resonant frequency of the first capacitor and the inductor, making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit. The control circuit may be configured to make the third switching control signal have a third switching state in which both the switch 1-1 and the switch 1-2 are closed or a fourth switching state in which both the switch 1-1 and the switch 1-2 are open according to the charging state of the battery.

The control circuit may be configured to, in case that it is identified that the power supply device does not support the PPS function but a voltage value which can be supplied is a predetermined value, output a fourth switching control signal having a switching frequency equal to or higher than the resonant frequency of the first capacitor and the inductor and making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit. The control circuit may be configured to output a fifth switching control signal having a switching frequency equal to the switching frequency of the fourth switching control signal and a duty cycle of 50% but a phase difference of 180 degrees from the fourth switching control signal to the second power conversion circuit. The control circuit may be configured to make the fourth switching control signal have the third switching state in which both the switch 1-1 and the switch 1-2 are closed or the fourth switching state in which both the switch 1-1 and the switch 1-2 are open according to the charging state of the battery.

The control circuit may be configured to, in case that a voltage of the battery exceeds the full charge voltage value, output the fourth switching control signal for alternating the first switching state and the second switching state via the fourth switching state to the first power conversion circuit 340. The control circuit may be configured to, in case that the voltage of the battery is lower than the full charge voltage value, output the fourth switching control signal for alternating the first switching state and the second switching state via the third switching state to the first power conversion circuit.

The portable electronic device may further include a battery switch (for example, the battery switch 360). One end of the battery switch may be connected to a point between the first output terminal and the load circuit and the other end of the battery switch may be connected to a point between the second output terminal and the battery. The control circuit may be configured to, in case that it is identified that the power supply device supports the PPS function and a predetermined event is generated by the electronic device, deactivate the second power conversion circuit and output the first switching control signal to the first power conversion circuit in a state in which the battery switch is open.

The predetermined event may include execution of a specific application or a predetermined user input.

The battery switch may include a diode making a current flow from the battery to the load circuit.

The control circuit may be configured to defer opening of the battery switch in case that a charging rate of the battery is lower than a predetermined rate, and open the battery switch in case that the charging rate of the battery is higher than or equal to the predetermined rate.

The control circuit may be configured to, in case that it is identified that the power supply device does not support the PPS function, a voltage value which can be supplied is a predetermined value, and a predetermined event is generated by the electronic device, deactivate the second power conversion circuit and output the first switching control signal to the first power conversion circuit in a state in which the battery switch is open.

According to an embodiment of the disclosure, a portable electronic device (for example, the electronic device 300 of FIG. 3) may include: a connector (for example, the connector 320) including a power terminal and a data terminal; a first power conversion circuit (for example, the first power conversion circuit 340); a second power conversion circuit (for example, the second power conversion circuit 350); a battery switch (for example, the battery switch 360); and a control circuit (the control circuit 399) electrically connected to the data terminal, the first power conversion circuit, the second power conversion circuit, and the battery switch. The first power conversion circuit may include: a first input terminal connected to the power terminal; a first output terminal connected to a load circuit of the portable electronic device; a switch 1-1, a switch 1-2, a switch 1-3, and a switch 1-4 connected in series from the first input terminal to a ground of the portable electronic device; an inductor having one end connected to a point between the switch 1-2 and the switch 1-3 and the other end connected to the first output terminal; and a first capacitor having one end connected to a point between the switch 1-1 and the switch 1-2 and the other end connected to a point between the switch 1-3 and the switch 1-4 The second power conversion circuit may include: a second input terminal connected to the power terminal; a second output terminal connected to a battery of the portable electronic device; a switch 2-1 and a switch 2-2 connected in series from the second input terminal to the second output terminal; a switch 2-3 and a switch 2-4 connected in series from the second output terminal to the ground; and a second capacitor having one end connected to a point between the switch 2-1 and the switch 2-2 and the other end connected to a point between the switch 2-3 and the switch 2-4. One end of the battery switch may be connected to a point between the first output terminal and the load circuit and the other end of the battery switch may be connected to a point between the second output terminal and the battery. The control circuit may be configured to, in case that it is identified that the power supply device supports or does not support a PPS function, a voltage value which can be supplied is a predetermined value, and a predetermined first event is generated by the electronic device, open the battery switch, deactivate the second power conversion circuit, and output a first switching control signal having a switching frequency equal to a resonant frequency of the first capacitor and the inductor and a duty cycle of 50% and alternating a first switching state in which the switch 1-1 and the switch 1-3 are closed and the switch 1-2 and switch 1-4 are open and a second switching state in which the switch 1-1 and the switch 1-3 are open and the switch 1-2 and the switch 1-4 are closed to the first power conversion circuit.

The first event may include execution of a specific application or a predetermined user input.

The battery switch may include a diode making a current flow from the battery to the load circuit.

The control circuit may be configured to defer opening of the battery switch in case that a charging rate of the battery is lower than a predetermined rate, and open the battery switch in case that the charging rate of the battery is higher than or equal to the predetermined rate.

The control circuit may be configured to, case that a predetermined second event is generated by the electronic device, close the battery switch, and output a second switching control signal having a switching frequency and a duty cycle equal to the switching frequency and the duty cycle of the first switching control signal but a phase difference of 180 degrees from the first switching control signal to the second power conversion circuit.

According to an embodiment of the disclosure, a method of operating a portable electronic device (for example, the electronic device 300 of FIG. 3) is provided. The portable electronic device may include a connector (for example, the connector 320) including a power terminal and a data terminal, a first power conversion circuit (for example, the first power conversion circuit 340), and a second power conversion circuit (for example, the second power conversion circuit 350). The first power conversion circuit may include a first input terminal connected to the power terminal, a first output terminal connected to a load circuit and a battery of the portable electronic device, a switch 1-1, a switch 1-2, a switch 1-3, and a switch 1-4 connected in series from the first input terminal to a ground of the portable electronic device, an inductor having one end connected to a point between the switch 1-2 and the switch 1-3 and the other end connected to the first output terminal, and a first capacitor having one end connected to a point between the switch 1-1 and the switch 1-2 and the other end connected to a point between the switch 1-3 and the switch 1-4. The second power conversion circuit may include a second input terminal connected to the power terminal, a second output terminal connected to the load circuit and the battery, a switch 2-1 and a switch 2-2 connected in series from the second input terminal to the second output terminal, a switch 2-3 and a switch 2-4 connected in series from the second output terminal to the ground, and a second capacitor having one end connected to a point between the switch 2-1 and the switch 2-2 and the other end connected to a point between the switch 2-3 and the switch 2-4. The method may include an operation of identifying whether a power supply device connected to the connector supports a PPS (programmable power supply) function through the data terminal (for example, operation 1010), an operation of, in case that it is identified that the power supply device supports the PPS function, outputting a first switching control signal having a switching frequency equal to a resonant frequency of the first capacitor and the inductor and a duty cycle of 50% and alternating a first switching state in which the switch 1-1 and the switch 1-3 are closed and the switch 1-2 and the switch 1-4 are open and a second switching state in which the switch 1-1 and the switch 1-3 are open and the switch 1-2 and the switch 1-4 are closed to the first power conversion circuit and output a second switching control signal having a switching frequency and a duty cycle, which are identical to the switching frequency and the duty cycle of the first switching control signal but a phase difference of 180 degrees from the first switching control signal to the second power conversion circuit (for example, operations 1020 and 1130), an operation of in case that it is identified that the power supply device does not support the PPS function, deactivating the second power conversion circuit and outputting a third switching control signal having a switching frequency equal to or higher than the resonant frequency of the first capacitor and the inductor, making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit (for example, operations 1030 and 1150), and an operation of making the third switching control signal have a third switching state in which both the switch 1-1 and the switch 1-2 are closed or a fourth switching state in which both the switch 1-1 and the switch 1-2 are open (for example, operations 1030 and 1150) according to the charging state of the battery.

The method may further include, in case that it is identified that the power supply device does not support the PPS function but a voltage value which can be supplied is a predetermined value: an operation of outputting a fourth switching control signal having a switching frequency equal to or higher than the resonant frequency of the first capacitor and the inductor and making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit (for example, operation 1160), an operation of outputting a fifth switching control signal having a switching frequency equal to the switching frequency of the fourth switching control signal and a duty cycle of 50% but a phase difference of 180 degrees from the fourth switching control signal to the second power conversion circuit (for example, operation 1160), and an operation of making the fourth switching control signal have the third switching state in which both the switch 1-1 and the switch 1-2 are closed or the fourth switching state in which both the switch 1-1 and the switch 1-2 are open (for example, operation 1160) according to the charging state of the battery.

The portable electronic device may include a battery switch having one end connected to a point between the first output terminal and the load circuit and the other end connected to a point between the second output terminal and the battery. The method may further include an operation of, in case that it is identified that the power supply device supports the PPS function and a predetermined event is generated by the electronic device, deactivating the second power conversion circuit and outputting the first switching control signal to the first power conversion circuit in a state in which the battery switch is open (for example, operation 1230).

The portable electronic device may include a battery switch having one end connected to a point between the first output terminal and the load circuit and the other end connected to a point between the second output terminal and the battery. The method may further include an operation of, in case that it is identified that the power supply device does not support the PPS function, a voltage value which can be supplied is a predetermined value, and a predetermined event is generated by the electronic device, deactivating the second power conversion circuit and outputting the first switching control signal to the first power conversion circuit in a state in which the battery switch is open (for example, operation 1230).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A portable electronic device comprising:
a connector comprising a power terminal and a data terminal;
a first power conversion circuit;
a second power conversion circuit; and
a control circuit electrically connected to the data terminal, the first power conversion circuit, and the second power conversion circuit,
wherein the first power conversion circuit comprises:
a first input terminal connected to the power terminal,
a first output terminal connected to a load circuit and a battery of the portable electronic device,
a switch 1-1, a switch 1-2, a switch 1-3, and a switch 1-4 connected in series from the first input terminal to a ground of the portable electronic device,
an inductor having one end connected to a point between the switch 1-2 and the switch 1-3 and the other end connected to the first output terminal, and
a first capacitor having one end connected to a point between the switch 1-1 and the switch 1-2 and the other end connected to a point between the switch 1-3 and the switch 1-4,
wherein the second power conversion circuit comprises:
a second input terminal connected to the power terminal,
a second output terminal connected to the load circuit and the battery,
a switch 2-1 and a switch 2-2 connected in series from the second input terminal to the second output terminal,
a switch 2-3 and a switch 2-4 connected in series from the second output terminal to the ground, and
a second capacitor having one end connected to a point between the switch 2-1 and the switch 2-2 and the other end connected to a point between the switch 2-3 and the switch 2-4, and
wherein the control circuit is configured to:
identify whether a power supply device connected to the connector supports a programmable power supply (PPS) function through the data terminal,
in case that it is identified that the power supply device supports the PPS function, output a first switching control signal having a switching frequency equal to a resonant frequency of the first capacitor and the inductor and a duty cycle of 50% and alternating a first switching state in which the switch 1-1 and the switch 1-3 are closed and the switch 1-2 and the switch 1-4 are open and a second switching state in which the switch 1-1 and the switch 1-3 are open and the switch 1-2 and the switch 1-4 are closed to the first power conversion circuit and output a second switching control signal having a switching frequency and a duty cycle, which are identical to the switching frequency and the duty cycle of the first switching control signal and a phase difference of 180 degrees from the first switching control signal to the second power conversion circuit,
in case that it is identified that the power supply device does not support the PPS function, deactivate the second power conversion circuit and output a third switching control signal having a switching frequency equal to or higher than the resonant frequency of the first capacitor and the inductor, making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit, and
make the third switching control signal have a third switching state in which both the switch 1-1 and the switch 1-2 are closed or a fourth switching state in which both the switch 1-1 and the switch 1-2 are open according to a charging state of the battery.

2. The portable electronic device of claim 1, wherein the control circuit is further configured to:
in case that it is identified that the power supply device does not support the PPS function and a voltage value supplied by the power supply device is a predetermined value,
output a fourth switching control signal having a switching frequency equal to or higher than the resonant frequency of the first capacitor and the inductor and making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit,
output a fifth switching control signal having a switching frequency equal to the switching frequency of the fourth switching control signal and a duty cycle of 50% and a phase difference of 180 degrees from the fourth switching control signal to the second power conversion circuit, and
make the fourth switching control signal have the third switching state in which both the switch 1-1 and the switch 1-2 are closed or the fourth switching state in which both the switch 1-1 and the switch 1-2 are open according to the charging state of the battery.

3. The portable electronic device of claim 2, wherein the control circuit is further configured to:
in case that a voltage of the battery exceeds the full charge voltage value, output the fourth switching control signal for alternating the first switching state and the second switching state via the fourth switching state to the first power conversion circuit, and
in case that the voltage of the battery is lower than the full charge voltage value, output the fourth switching control signal for alternating the first switching state and the second switching state via the third switching state to the first power conversion circuit.

4. The portable electronic device of claim 1, further comprising:

a battery switch, wherein one end of the battery switch is connected to a point between the first output terminal and the load circuit, wherein the other end of the battery switch is connected to a point between the second output terminal and the battery, and wherein, in case that it is identified that the power supply device supports the PPS function and a predetermined event is generated by the portable electronic device, the control circuit is configured to:

deactivate the second power conversion circuit, and output the first switching control signal to the first power conversion circuit in a state in which the battery switch is open.

5. The portable electronic device of claim 4, wherein the predetermined event comprises execution of a specific application or a predetermined user input.

6. The portable electronic device of claim 4, wherein the battery switch comprises a diode making a current flow from the battery to the load circuit.

7. The portable electronic device of claim 4, wherein the control circuit is further configured to:

defer opening of the battery switch in case that a charging rate of the battery is lower than a predetermined rate, and open the battery switch in case that the charging rate of the battery is higher than or equal to the predetermined rate.

8. The portable electronic device of claim 1, further comprising:

a battery switch, wherein one end of the battery switch is connected to a point between the other end of the inductor and the load circuit, wherein the other end of the battery switch is connected to a point between the second output terminal and the battery, and wherein, in case that it is identified that the power supply device does not support the PPS function, a voltage value supplied by the power supply device is a predetermined value, and a predetermined event is generated by the portable electronic device, the control circuit is configured to:

deactivate the second power conversion circuit, and output the first switching control signal to the first power conversion circuit in a state in which the battery switch is open.

9. The portable electronic device of claim 8, wherein the predetermined event comprises execution of a specific application or a predetermined user input.

10. The portable electronic device of claim 8, wherein the battery switch comprises a diode making a current flow from the battery to the load circuit.

11. The portable electronic device of claim 8, wherein the control circuit is further configured to:

defer opening of the battery switch in case that a charging rate of the battery is lower than a predetermined rate, and open the battery switch in case that the charging rate of the battery is higher than or equal to the predetermined rate.

12. A portable electronic device comprising:

a connector comprising a power terminal and a data terminal;

a first power conversion circuit;

a second power conversion circuit;

a battery switch; and a control circuit electrically connected to the data terminal, the first power conversion circuit, the second power conversion circuit, and the battery switch, wherein the first power conversion circuit comprises:

a first input terminal connected to the power terminal, a first output terminal connected to a load circuit of the portable electronic device, a switch 1-1, a switch 1-2, a switch 1-3, and a switch 1-4 connected in series from the first input terminal to a ground of the portable electronic device, an inductor having one end connected to a point between the switch 1-2 and the switch 1-3 and the other end connected to the first output terminal, and a first capacitor having one end connected to a point between the switch 1-1 and the switch 1-2 and the other end connected to a point between the switch 1-3 and the switch 1-4, wherein the second power conversion circuit comprises:

a second input terminal connected to the power terminal, a second output terminal connected to a battery of the portable electronic device, a switch 2-1 and a switch 2-2 connected in series from the second input terminal to the second output terminal, a switch 2-3 and a switch 2-4 connected in series from the second output terminal to the ground, and a second capacitor having one end connected to a point between the switch 2-1 and the switch 2-2 and the other end connected to a point between the switch 2-3 and the switch 2-4, wherein one end of the battery switch is connected to a point between the first output terminal and the load circuit and the other end of the battery switch is connected to a point between the second output terminal and the battery, and wherein the control circuit is configured to, in case that it is identified that a power supply device supports or does not support a programmable power supply (PPS) function, a voltage value supplied by the power supply device is a predetermined value, and a predetermined first event is generated by the portable electronic device:

open the battery switch, deactivate the second power conversion circuit, and output a first switching control signal having a switching frequency equal to a resonant frequency of the first capacitor and the inductor and a duty cycle of 50% and alternating a first switching state in which the switch 1-1 and the switch 1-3 are closed and the switch 1-2 and switch 1-4 are open and a second switching state in which the switch 1-1 and the switch 1-3 are open and the switch 1-2 and the switch 1-4 are closed to the first power conversion circuit.

13. The portable electronic device of claim 12, wherein the first event comprises execution of a specific application or a predetermined user input.

14. The portable electronic device of claim 12, wherein the battery switch comprises a diode making a current flow from the battery to the load circuit.

15. The portable electronic device of claim 12, wherein the control circuit is further configured to:

defer opening of the battery switch in case that a charging rate of the battery is lower than a predetermined rate; and open the battery switch in case that the charging rate of the battery is higher than or equal to the predetermined rate.

16. The portable electronic device of claim 13, wherein the control circuit is further configured to, in case that a predetermined second event is generated by the portable electronic device:

close the battery switch; and output a second switching control signal having a switching frequency and a duty cycle equal to the switching frequency and the duty cycle of the first switching control signal and a phase difference of 180 degrees from the first switching control signal to the second power conversion circuit.

17. A method of operating a portable electronic device, the portable electronic device comprising:

a connector comprising a power terminal and a data terminal;

a first power conversion circuit; and a second power conversion circuit, wherein the first power conversion circuit comprises:

a first input terminal connected to the power terminal, a first output terminal connected to a load circuit and a battery of the portable electronic device, a switch 1-1, a switch 1-2, a switch 1-3, and a switch 1-4 connected in series from the first input terminal to a ground of the portable electronic device, an inductor having one end connected to a point between the switch 1-2 and the switch 1-3 and the other end connected to the first output terminal, and a first capacitor having one end connected to a point between the switch 1-1 and the switch 1-2 and the other end connected to a point between the switch 1-3 and the switch 1-4, wherein the second power conversion circuit comprises:

a second input terminal connected to the power terminal, a second output terminal connected to the load circuit and the battery, a switch 2-1 and a switch 2-2 connected in series from the second input terminal to the second output terminal, a switch 2-3 and a switch 2-4 connected in series from the second output terminal to the ground, and a second capacitor having one end connected to a point between the switch 2-1 and the switch 2-2 and the other end connected to a point between the switch 2-3 and the switch 2-4, and wherein the method comprises:

identifying whether a power supply device connected to the connector supports a programmable power supply (PPS) function through the data terminal, in case that it is identified that the power supply device supports the PPS function, outputting a first switching control signal having a switching frequency equal to a resonant frequency of the first capacitor and the inductor and a duty cycle of 50% and alternating a first switching state in which the switch 1-1 and the switch 1-3 are closed and the switch 1-2 and the switch 1-4 are open and a second switching state in which the switch 1-1 and the switch 1-3 are open and the switch 1-2 and the switch 1-4 are closed to the first power conversion circuit and output a second switching control signal having a switching frequency and a duty cycle, which are identical to the switching frequency and the duty cycle of the first switching control signal and a phase difference of 180 degrees from the first switching control signal to the second power conversion circuit, in case that it is identified that the power supply device does not support the PPS function, deactivating the second power conversion circuit and outputting a third switching control signal having a switching frequency equal to or higher than the resonant frequency of the first capacitor and the inductor, making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit, and making the third switching control signal have a third switching state in which both the switch 1-1 and the switch 1-2 are closed or a fourth switching state in which both the switch 1-1 and the switch 1-2 are open according to a charging state of the battery.

18. The method of claim 17, further comprising, in case that it is identified that the power supply device does not support the PPS function and a voltage value supplied by the power supply device is a predetermined value:

outputting a fourth switching control signal having a switching frequency equal to or higher than the resonant frequency of the first capacitor and the inductor and making the switch 1-1 and the switch 1-2 have an equal duty cycle and a phase difference of 180 degrees, making the switch 1-1 and the switch 1-4 have a complementary relation, and making the switch 1-2 and the switch 1-3 have a complementary relation to the first power conversion circuit;

outputting a fifth switching control signal having a switching frequency equal to the switching frequency of the fourth switching control signal and a duty cycle of 50% and a phase difference of 180 degrees from the fourth switching control signal to the second power conversion circuit; and making the fourth switching control signal have the third switching state in which both the switch 1-1 and the switch 1-2 are closed or the fourth switching state in which both the switch 1-1 and the switch 1-2 are open according to the charging state of the battery.

19. The method of claim 17, wherein the portable electronic device further comprises a battery switch having one end connected to a point between the first output terminal and the load circuit and the other end connected to a point between the second output terminal and the battery, and wherein the method further comprises, in case that it is identified that the power supply device supports the PPS function and a predetermined event is generated by the portable electronic device:

deactivating the second power conversion circuit, and outputting the first switching control signal to the first power conversion circuit in a state in which the battery switch is open.

20. The method of claim 17, wherein the portable electronic device further comprises a battery switch having one end connected to a point between the first output terminal and the load circuit and the other end connected to a point between the second output terminal and the battery, and wherein the method further comprises, in case that it is identified that the power supply device does not support the PPS function, a voltage value supplied by the power supply device is a predetermined value, and a predetermined event is generated by the portable electronic device:

deactivating the second power conversion circuit, and outputting the first switching control signal to the first power conversion circuit in a state in which the battery switch is open.

* * * * *